US008477960B2

(12) United States Patent
Hintzen

(10) Patent No.: US 8,477,960 B2
(45) Date of Patent: Jul. 2, 2013

(54) SYSTEM FOR ALLOWING SELECTIVE LISTENING ON MULTIPLE TELEVISIONS

(75) Inventor: Mark Nicholas Hintzen, Fort Myers Beach, FL (US)

(73) Assignee: WAVRYDR, L.L.C., Marion, IA (US)

( * ) Notice: Subject to any disclaimer, the term of this patent is extended or adjusted under 35 U.S.C. 154(b) by 964 days.

(21) Appl. No.: 12/478,451

(22) Filed: Jun. 4, 2009

(65) Prior Publication Data

US 2010/0310089 A1 Dec. 9, 2010

(51) Int. Cl.
*H04B 3/00* (2006.01)

(52) U.S. Cl.
USPC ................................ 381/81; 381/2; 340/384.1

(58) Field of Classification Search
USPC ................. 381/1-4, 58, 111, 81, 77, 11, 105, 381/104, 107, 307, 300; 700/94; 455/73, 455/3.06, 575.1, 306; 348/14.09, 352, 723, 348/706, 724; 725/34, 141, 38, 81; 340/384.1, 340/825.24
See application file for complete search history.

(56) References Cited

U.S. PATENT DOCUMENTS 3,927,316 A 12/1975 Citta
4,829,500 A 5/1989 Saunders
4,899,388 A 2/1990 Mlodzikowski et al.
5,173,900 A * 12/1992 Miller et al. .................. 370/349
5,214,705 A 5/1993 Kloker et al.
5,218,641 A 6/1993 Abe et al.
5,371,553 A * 12/1994 Kawamura et al. ............. 725/59
5,455,570 A 10/1995 Cook et al.
5,574,966 A 11/1996 Barzegar et al.
5,581,576 A 12/1996 Lanzetta et al.
5,666,422 A 9/1997 Harrison et al.
5,708,961 A 1/1998 Hylton et al.
6,195,726 B1 * 2/2001 Hogan .......................... 711/112
6,658,115 B1 12/2003 Lam
6,731,761 B1 5/2004 Zablocki et al.
6,757,913 B2 6/2004 Knox
7,050,763 B2 5/2006 Stengel et al.
7,817,017 B1 * 10/2010 Benun et al. ............... 340/384.1
7,962,090 B2 * 6/2011 Knox ........................... 455/3.06
2004/0234088 A1 * 11/2004 McCarty et al. .............. 381/306
2008/0181426 A1 7/2008 Hornback
2009/0058361 A1 * 3/2009 John ............................ 320/128

* cited by examiner

*Primary Examiner* — Lun-See Lao
(74) *Attorney, Agent, or Firm* — Howison & Arnott, L.L.P.

(57) ABSTRACT

Provided is an audio transmission system for use in environments having multiple televisions. An audio transmitter couples to a television via the television's audio output jack and frequency modulates the audio signal for transmission on a user selected channel. An audio receiver receives the frequency modulated audio signal and extracts the audio signal. The audio receiver may be charged in a charging station.

21 Claims, 25 Drawing Sheets

FROM FIG. 11B

SYSTEM FOR ALLOWING SELECTIVE LISTENING ON MULTIPLE TELEVISIONS

TECHNICAL FIELD

The present disclosure is in the field of audio/video equipment and, more particularly, in the field of providing selectable sound in an environment having multiple televisions.

BACKGROUND

Locations with multiple televisions, such as sports bars, face the difficulty of providing sound to their patrons. The multiple televisions, which are often tuned to different television channels, project different sounds based on the television channel. Accordingly, it may be difficult or impossible to hear a particular television. This is further complicated by the fact that users desiring to watch different televisions may be in relatively close proximity to one another. Even televisions projecting the same sound may be undesirable if the televisions are positioned in such a way that the sounds do not reach a viewer in a perfectly synchronized manner.

One solution for this problem is to turn the sound off on each of the televisions and to turn on closed-captioning, thereby visually providing speech in the form of text associated with the corresponding television. This is not an ideal solution however, as it requires the viewer's full attention and detracts from the viewing experience. This solution also omits other sounds such as music and environmental sounds (e.g., referee whistles, game buzzers, and crowd noise). Furthermore, for those who are visually impaired or seated a distance from the television, it may be impossible to read the closed-caption text.

Accordingly, what is needed is an improved audio/video system for locations with multiple televisions.

SUMMARY

In one embodiment, a system for transmitting audio is provided. The system comprises an audio transmitter and an audio receiver. The audio transmitter is configured to couple to a television and has an input audio port, a transmission channel switch, transmission circuitry, and a plurality of optical transmitters. The input audio port is configured to receive an audio signal only from an output audio port of the television. The transmission channel switch has a plurality of transmission settings selectable by a first user, wherein each of the plurality of transmission settings corresponds to a different predefined frequency. The transmission circuitry is coupled to the transmission channel switch and input audio port, and is configured to generate a frequency modulated signal representing the audio signal, wherein a frequency used to modulate the signal corresponds to a transmission setting of the transmission channel switch selected by the first user. The plurality of optical transmitters are coupled to the transmission circuitry and positioned to transmit the generated frequency modulated signal as light out of the transmitter. The audio receiver has a plurality of optical receivers, a reception channel switch, reception circuitry, and an output port. The plurality of optical receivers are configured to receive the generated frequency modulated signal transmitted as light by the audio transmitter and to convert the received signal into an electrical current. The reception channel switch has a plurality of reception settings selectable by a second user, wherein each of the plurality of reception settings corresponds to one of the transmission settings, and wherein the reception settings are each associated with the frequency of the corresponding transmission setting. The reception circuitry is coupled to the optical receivers and the reception channel switch, wherein the reception circuitry is configured to recover the audio signal from the electrical current based on a reception setting selected by the second user. The output port is configured to provide the recovered audio to a second user.

In another embodiment, an audio transmission system is provided. The audio transmission system comprises first and second audio transmitters and first and second audio receivers. The first audio transmitter has a first audio input jack, a first transmission circuit, and a plurality of first infrared emitters. The first audio input jack is coupled to a first audio output jack of a first television for receiving a first audio signal from the first television. The first transmission circuit is configured to transmit the first audio signal as a first frequency modulated signal that is modulated at a first frequency. The plurality of first infrared emitters are configured to broadcast the first frequency modulated signal. The second audio transmitter has a second audio input jack, a second transmission circuit, and a plurality of second infrared emitters. The second audio input jack is coupled to a second audio output jack of a second television for receiving a second audio signal from the second television. The second transmission circuit is configured to transmit the second audio signal as a second frequency modulated signal that is modulated at a second frequency that is different than the first frequency. The plurality of second infrared emitters is configured to broadcast the second frequency modulated signal. The first receiver has a plurality of first infrared detectors, a first reception circuit, and a first audio output port. The plurality of first infrared detectors are configured to receive the first and second frequency modulated signals and to convert the first and second frequency modulated signals to an electrical current. The first reception circuit is configured to retrieve the first audio signal from the electrical current representing the first frequency modulated signal based on a setting selected by a first user. The first audio output port is configured to provide the first audio signal to the first user. The second receiver has a plurality of second infrared detectors, a second reception circuit, and a second audio output port. The plurality of second infrared detectors are configured to receive the first and second frequency modulated signals and to convert the first and second frequency modulated signals to the electrical current. The second reception circuit is configured to retrieve the second audio signal from the electrical current representing the second frequency modulated signal based on a setting selected by a second user. The second audio output port is configured to provide the second audio signal to the second user.

In still another embodiment, an audio transmission system is provided. The audio transmission system comprises first and second audio transmitters and an audio receiver. The first audio transmitter has a first audio input jack, a first transmission circuit, and a plurality of first emitters. The first audio input jack is coupled to a first audio output jack of a first television for receiving a first audio signal from the first television. The first transmission circuit is configured to transmit the first audio signal as a first frequency modulated signal that is modulated at a first frequency. The plurality of first emitters are configured to broadcast the first frequency modulated signal. The second audio transmitter has a second audio input jack, a second transmission circuit, and a plurality of second emitters. The second audio input jack is coupled to a second audio output jack of a second television for receiving a second audio signal from the second television. The second transmission circuit is configured to transmit the second audio signal as a second frequency modulated signal that is modulated at a second frequency that is different than the first frequency. The plurality of second emitters are configured to broadcast the second frequency modulated signal. The receiver has a plurality of detectors, a reception circuit, and an audio output port. The plurality of detectors are configured to receive the first and second frequency modulated signals and to convert at least the first frequency modulated signal to an electrical current. The reception circuit is configured to retrieve the first audio signal from the electrical current representing the first frequency modulated signal. The audio output port is configured to provide the first audio signal to an external audio device.

BRIEF DESCRIPTION OF THE DRAWINGS

For a more complete understanding, reference is now made to the following description taken in conjunction with the accompanying Drawings in which.

DETAILED DESCRIPTION

Figure 1:
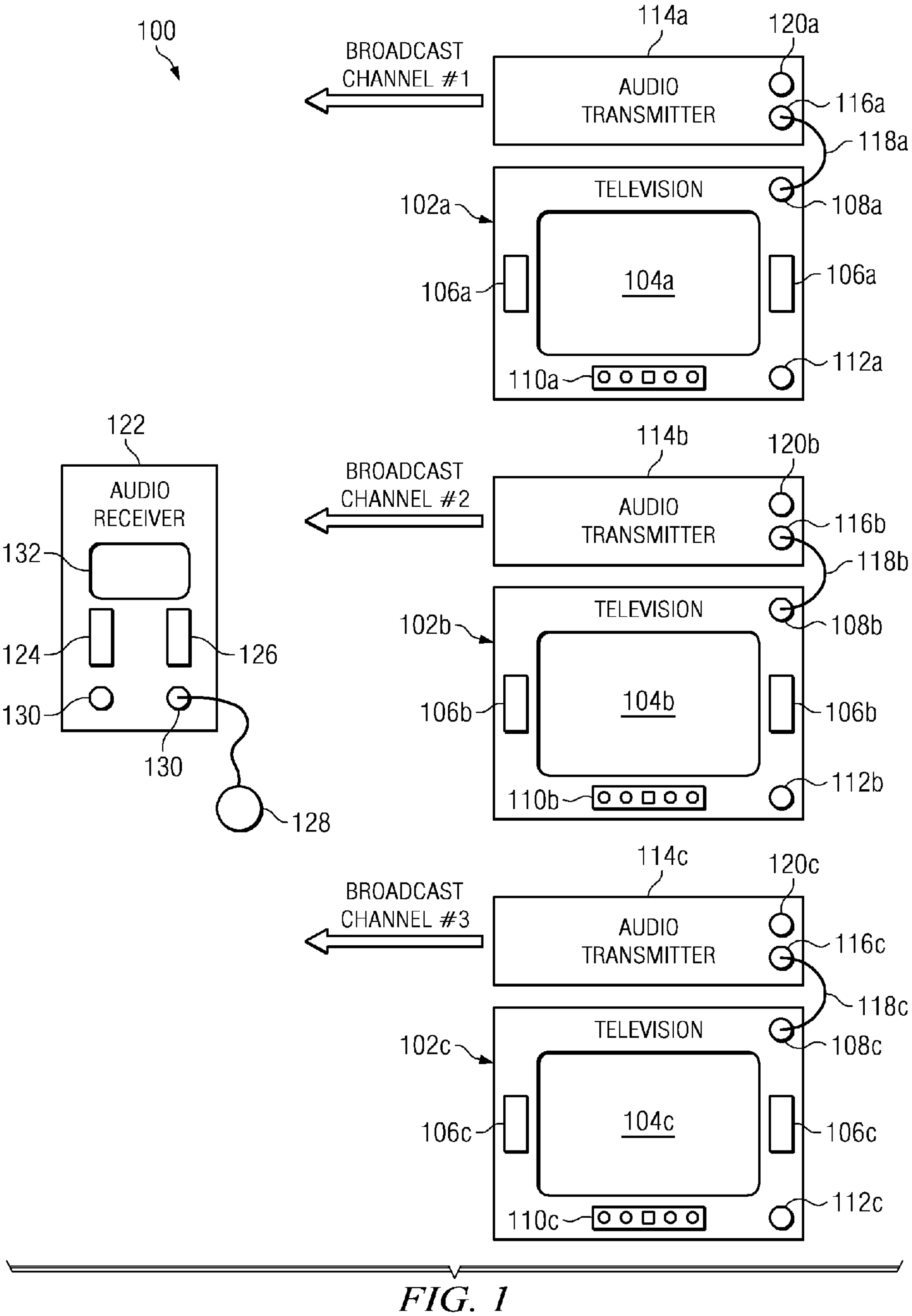
FIG. 1 illustrates an audio/visual environment within which aspects of the present disclosure may be practiced.

Referring now to the drawings, wherein like reference numbers are used herein to designate like elements throughout, the various views and embodiments of a system for allowing selective listening on multiple televisions are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring to FIG. 1, one embodiment of an audio/visual (A/V) system 100 is illustrated. The A/V system 100 includes a plurality of televisions 102*a*-102*c* that may be oriented in the same or different directions. The plurality of televisions 102*a*-102*c* include, respectively, display panels 104*a*-104*c*, speakers 106*a*-106*c*, audio output jacks or other audio access mechanisms 108*a*-108*c* that may be used to direct sound ordinarily projected via the speakers 106*a*-106*c* to an output destination, and a control panel 110*a*-110*c* containing various control mechanisms (e.g., power, volume, and television channel controls). Use of the audio output jacks 108*a*-108*c* may allow for the continued use of corresponding speakers 106*a*-106*c* or may disable sound from being projected by the speakers. Each television 102*a*-102*c* is coupled to an audio/visual signal input (e.g., a cable, optical, satellite, or other television signal input) via an input port 112*a*-112*c*.

In ordinary usage, the televisions 102*a*-102*c* may be tuned to different television channels. For example, in an environment such as a sports bar or an exercise facility, television 102*a* may be displaying a first television show on a first television channel, television 102*b* may be displaying a second television show on a second television channel, and television 102*c* may be displaying a third television show on a third television channel. As three different television channels are being displayed, the sounds corresponding to each of the television channels will be different. Accordingly, it may be difficult to hear the sound projected by, for example, the television 102*a* due to the sounds being simultaneously projected by the televisions 102*b* and 102*c*. This is further complicated by the fact that users desiring to watch different ones of the televisions 102*a*-102*c* may be in relatively close proximity to one another.

One common solution for this problem is to turn the sound off on each of the televisions 102*a*-102*c* and to turn on closed-captioning, thereby visually providing text corresponding to the speech associated with the corresponding television. This is not an ideal solution however, as it requires the viewer's full attention and detracts from the viewing experience. This solution also omits other sounds such as music and environmental sounds (e.g., referee whistles, game buzzers, and crowd noise). Furthermore, for those who are visually impaired or seated a distance from the television, it may be impossible to read the closed-caption text.

To address this problem, the present disclosure provides audio transmitters 114*a*-114*c* that include audio input jacks 116*a*-116*c*. The audio input jacks 116*a*-116*c* are coupled to the audio output jacks 108*a*-108*c*, respectively, via cables 118*a*-118*c* and so may receive audio corresponding to the television program being displayed on the corresponding televisions 102*a*-102*c*. The audio input jacks 116*a*-116*c* are coupled to the audio output jacks 108*a*-108*c* to avoid the need for complicated wiring or connections. For example, there is no need to couple the audio transmitters 114*a*-114*c* to the signal inputs 112*a*-112*c* or to otherwise change the configuration of the televisions 102*a*-102*c*. This enables the televisions 102*a*-102*c* to remain as originally set up for the environment 100, and the audio transmitters can simply be plugged into the audio output jacks 108*a*-108*c* without any reconfiguration of the televisions 102*a*-102*c*. This provides for simple installation of the audio transmitters 114*a*-114*c*, and also provides a simple way to rollback the installation if the audio transmitters are no longer desired, as all that is needed to uninstall the audio transmitters 114*a*-114*c* is to unplug the audio input jacks 116*a*-116*c* from the audio output jacks 108*a*-108*c*. It is understood that a power line (not shown) may be coupled to a power jack 120*a*-120*c* of the audio transmitters 114-114*c*, respectively, and the power lines may be coupled to an external power supply (not shown) that provides power to the respective audio transmitter. Such a power line may be removed from a wall outlet or other power source to completely uninstall the audio transmitters 114*a*-114*c*.

As will be described below in greater detail, the audio transmitters 114*a*-114*c* receive the audio input for the corresponding television 102*a*-102*c* and broadcast the audio on one of a plurality of pre-selected wave channels. In the present disclosure, the term "wave channel" is used to identify a sub-carrier of light (described below in greater detail) and to distinguish the wave channels from television channels. The present embodiment makes use of light sub-carriers in order to provide directional wave channels that enable (theoretically) an infinite number of televisions to be serviced. Televisions and corresponding audio transmitters can therefore be arranged to take advantage of the directional control that can be exercised over the light sub-carriers. In contrast, other transmission mediums, such as radio frequency (RF) transmissions, are more limited due to their multi-directional nature that minimizes or eliminates positional advantages, particularly in relatively small environments with multiple televisions and audio transmitters.

In the present example, the three audio transmitters 114*a*-114*c* may be set to wave channel #1, wave channel #2, and wave channel #3, respectively. The televisions 102*a*-102*c* may be labeled with the corresponding wave channel number so that viewers may readily identify which wave channel is associated with a particular one of the televisions. Also illustrated for each of the audio transmitters 114*a*-114*c* are the power jacks 120*a*-120*c*, respectively, that may be coupled to an external power supply (not shown).

It is understood that a single television channel may be set on different wave channel numbers for the audio transmitters 114*a*-114*c*. For example, the televisions 102*a* and 102*b* may be set to the same television channel, and the audio transmitters 114*a* and 114*b* may broadcast the corresponding sound on the same wave channel (e.g., wave channel #1) or on different wave channels (e.g., wave channels #1 and #2). Setting the audio transmitters 114*a*-114*c* to broadcast on different wave channels enables the televisions 102*a*-102*c* to be set to whatever television channel is desired without needing to change the wave channels of the audio transmitters 114*a*-114*c*.

An audio receiver 122 may be used to receive the audio that is broadcast from any of the audio transmitters 114*a*-114*c*. In the present embodiment, the audio receiver 122 may include a volume control 124 and a wave channel control 126. The wave channel control 126 enables a user (not shown) of the audio receiver 122 to select one of the three televisions 102*a*-102*c*. In response to the user selection, internal circuitry of the audio receiver 122 is configured to receive the audio broadcast by the television corresponding to the selected wave channel. For example, the user may tune in to hear the audio projected by the television 102*a* by manipulating the wave channel control 126 to select wave channel #1. Similarly, the user may tune in to hear the audio projected by the televisions 102*b* or 102*c* by manipulating the wave channel control 126 to select wave channel #2 or wave channel #3, respectively. A hearing device 128, such as an ear bud, a headset, or one or more powered speakers, may be coupled to an audio jack 130 of the audio receiver 122 to enable the user of the audio receiver to clearly hear the received audio without disturbing surrounding users. In some examples, multiple audio jacks 130 may be present in the audio receiver 122 so that multiple users can access the audio via the same audio receiver. A display 132, such as a liquid crystal display (LCD) may be used to provide information to the user regarding the current wave channel and/or audio volume.

Figure 2A:
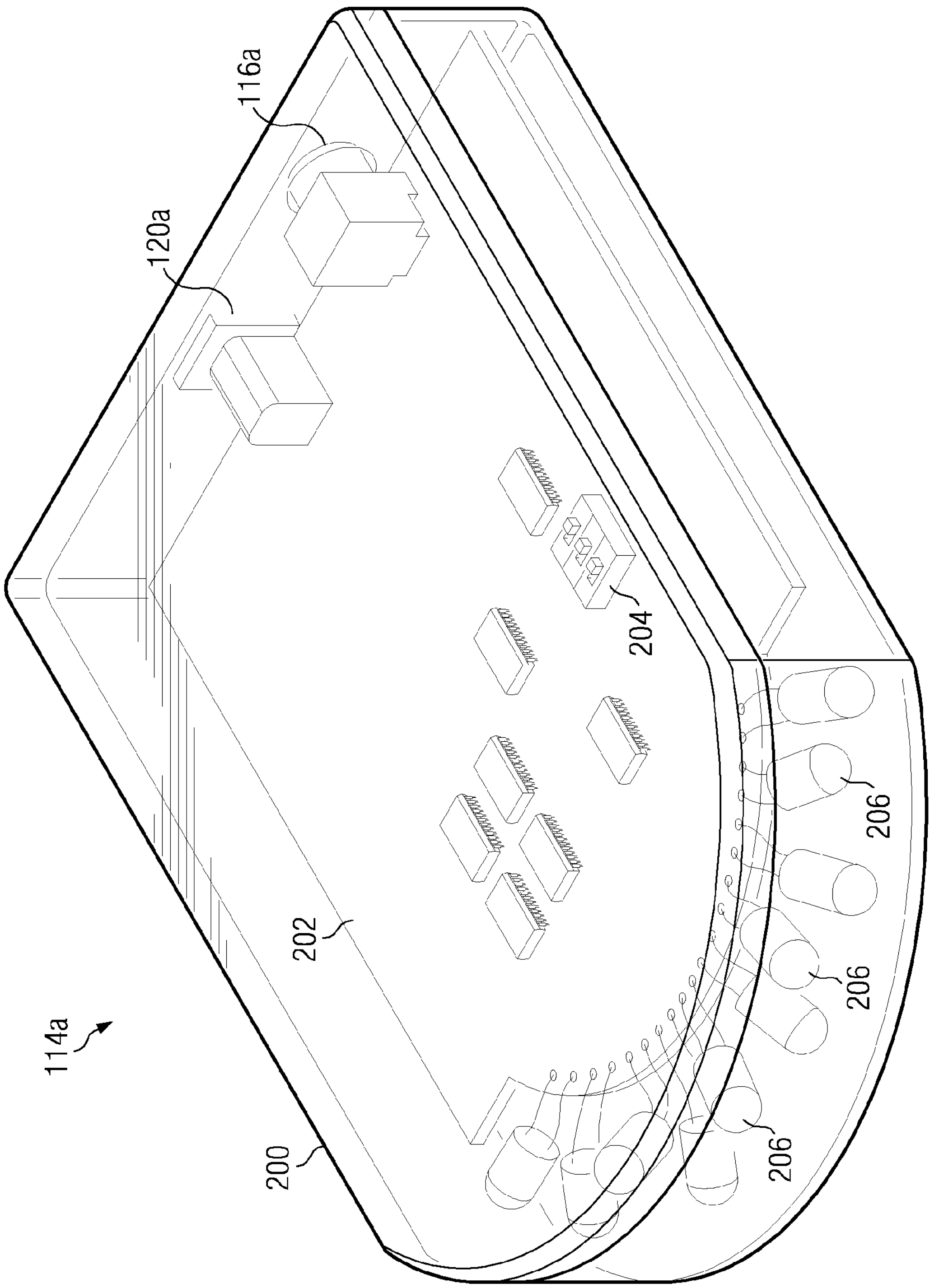
FIG. 2A illustrates a perspective view of one embodiment of an audio transmitter that may be used in the environment of FIG. 1.

Referring to FIG. 2A, a perspective view of one embodiment of the audio transmitter 114*a* is illustrated in greater detail. The audio transmitter 114*a* includes a housing 200 having a circuit board 202 positioned therein. External connections to the circuit board 202 are provided via the audio input jack 116*a* (FIG. 1) and power jack 120*a* (FIG. 1). A wave channel select mechanism 204, which is composed of switches in the present example, is included on the circuit board 202. Emitters 206 are coupled to the circuit board 202 and used to broadcast the audio on the selected wave channel.

Figure 2B:
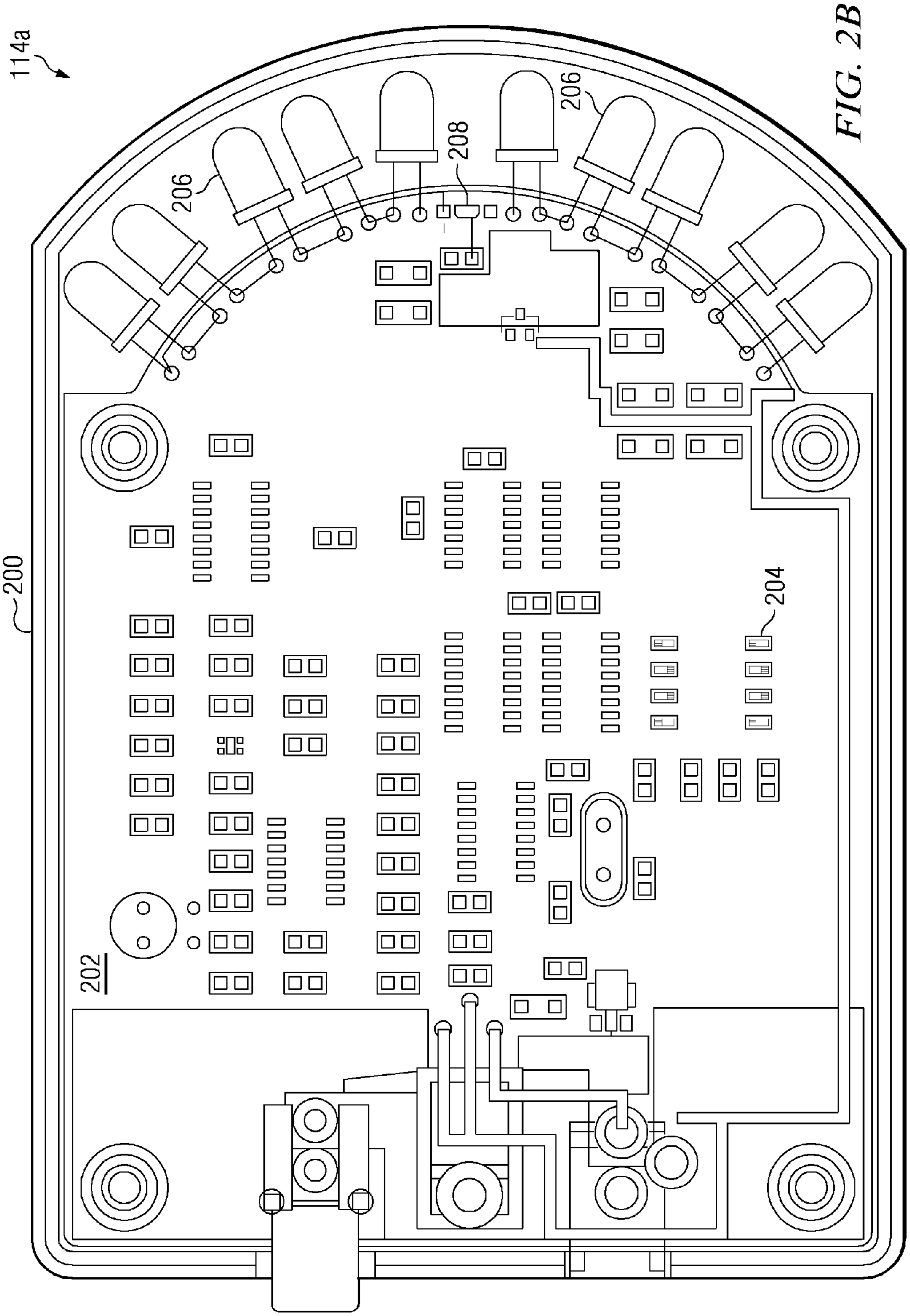
FIG. 2B illustrates a top view of the audio transmitter of FIG. 2A.

Referring to FIG. 2B, a top diagrammatic view of one embodiment of the audio transmitter 114*a* of FIG. 2 is provided. In addition to the housing 200, circuit board 202, wave channel selection switch 204, and emitters 206, an LED 208 is illustrated at the front of the housing 200. As can be seen in FIGS. 2A and 2B, the emitters 206 may be spaced along a substantially curved line at a front portion of the audio transmitter 144*a* and oriented to face away from the interior of the audio transmitter. Furthermore, the emitters 206 may be oriented at different angles relative to a horizontal plane formed the circuit board 202. It is understood that some emitters 206 may be oriented as similar or identical angles.

Figure 3:
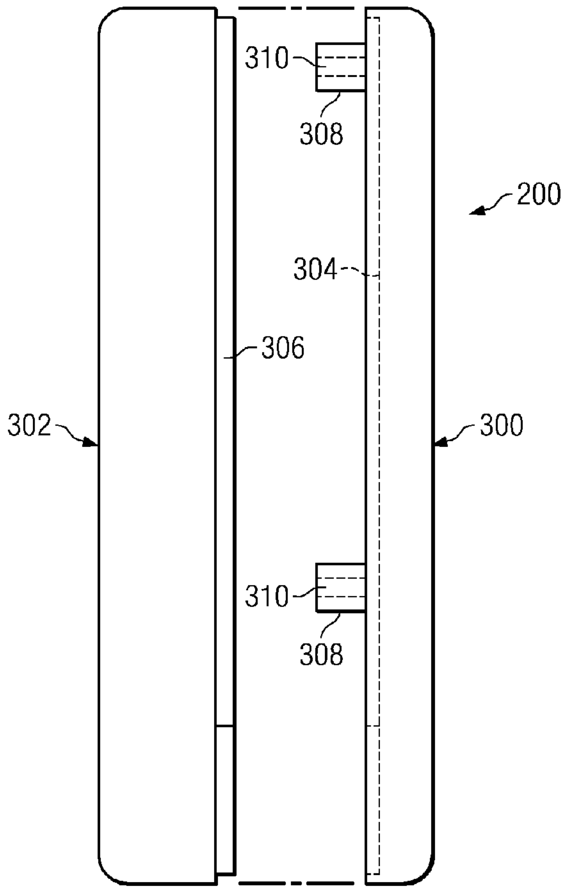
FIG. 3 illustrates a side view of one embodiment of a housing that may be used with the audio transmitter of FIG. 2.

Referring to FIG. 3, a side view of one embodiment of the housing 200 of FIG. 2 is illustrated. In the present example, the housing 200 includes a top piece 300 and a bottom piece 302. The top piece 300 and bottom piece 302 may be formed using a clear polycarbonate or any other suitable material. The top piece 300 may include an indentation 304 that is configured to receive a lip or other protrusion 306 of the bottom piece 302. The top piece 300 may also include one or more shafts 308 having bores 310 formed at least partly therethrough. The bores 310 are sized to receive fasteners (not shown) such as screws. The shafts 308 are aligned with apertures (not shown) in the bottom piece 302 through which the fasteners may be inserted into the bores 310 in order to fasten the top piece 300 to the bottom piece 302. It is understood that the particular shape and configuration of the housing 200 may vary and that the illustrated housing in for purposes of example only.

Figure 4:
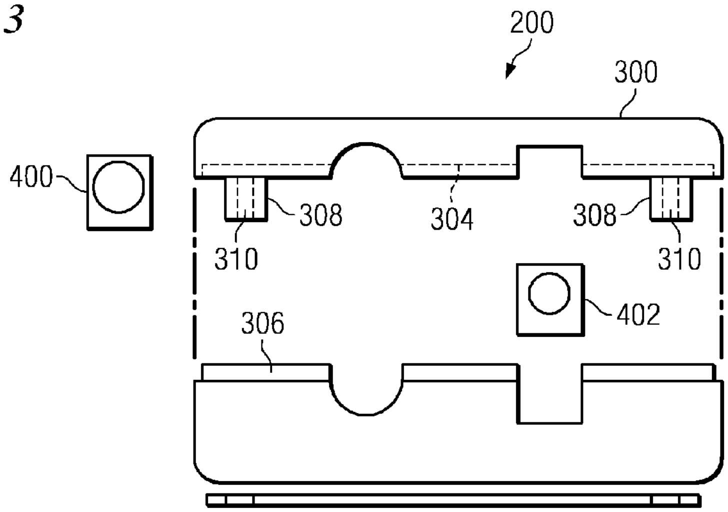
FIG. 4 illustrates a rear view of the housing of FIG. 3.

Referring to FIG. 4, a rear view of one embodiment of the housing 200 of FIG. 2 is illustrated with the top piece 300 and bottom piece 302. As shown, a first connector 400 may be provided for the audio input jack 116*a* and a second connector 402 may be provided for the power jack 120*a*.

Figure 5A:
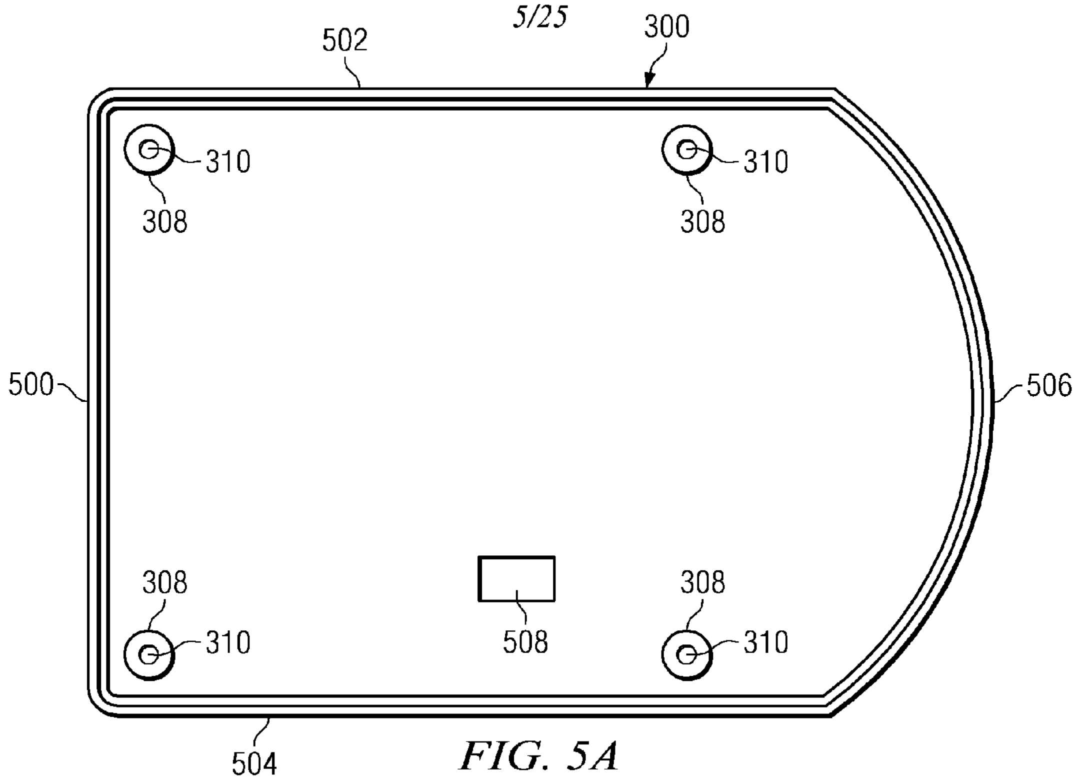
FIGS. 5A and 5B illustrate a top view and a bottom view, respectively, of the housing of FIG. 3.
Figure 5B:
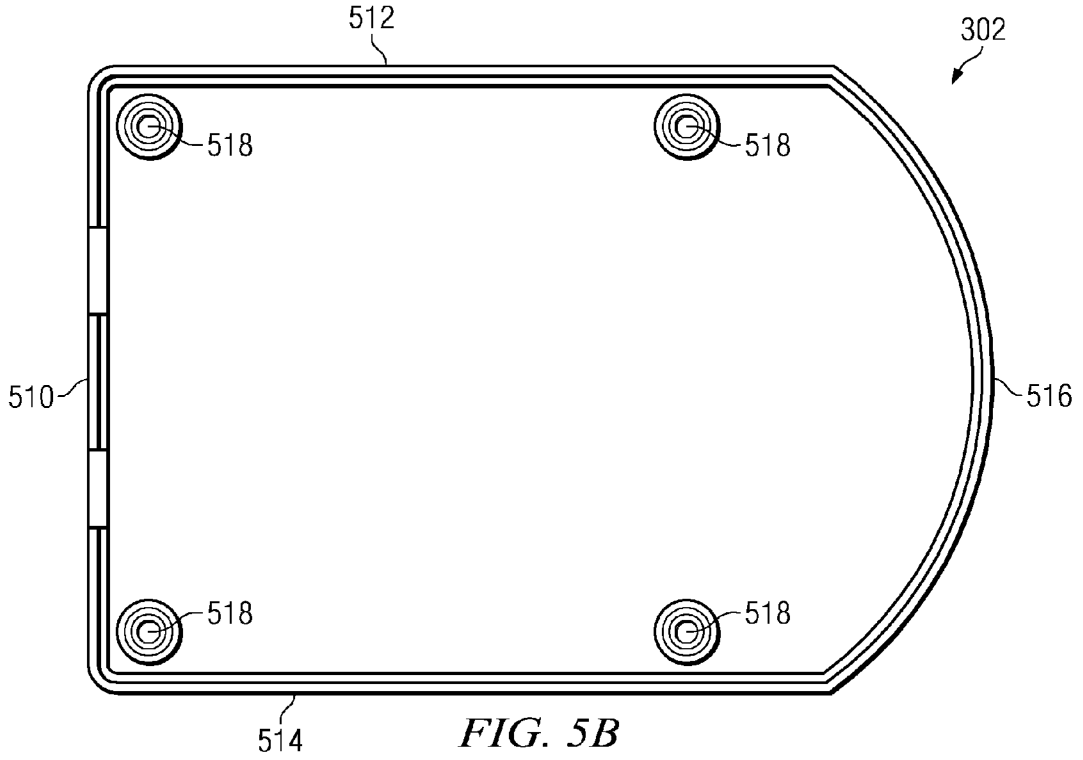

Referring to FIGS. 5A and 5B, a top view of the top piece 300 (FIG. 5A) and a bottom view of the bottom piece 302 (FIG. 5B) are illustrated. In the present example, the top piece 300 is substantially rectangular with a relatively straight rear edge 500 and sides 502, 504, and a curved front edge 506. An aperture 508 is provided to access the wave channel select mechanism 204 (FIG. 2). In some embodiments, the aperture 508 may be omitted if other means are provided for wave channel selection. The bottom piece 302 has a shape that is substantially similar or identical to the top piece 300. Accordingly, the bottom piece 302 includes a relatively straight rear edge 510 and sides 512, 514, and a curved front edge 516. Apertures 518 align with the shafts 308 of the top piece 300.

Figure 6A:
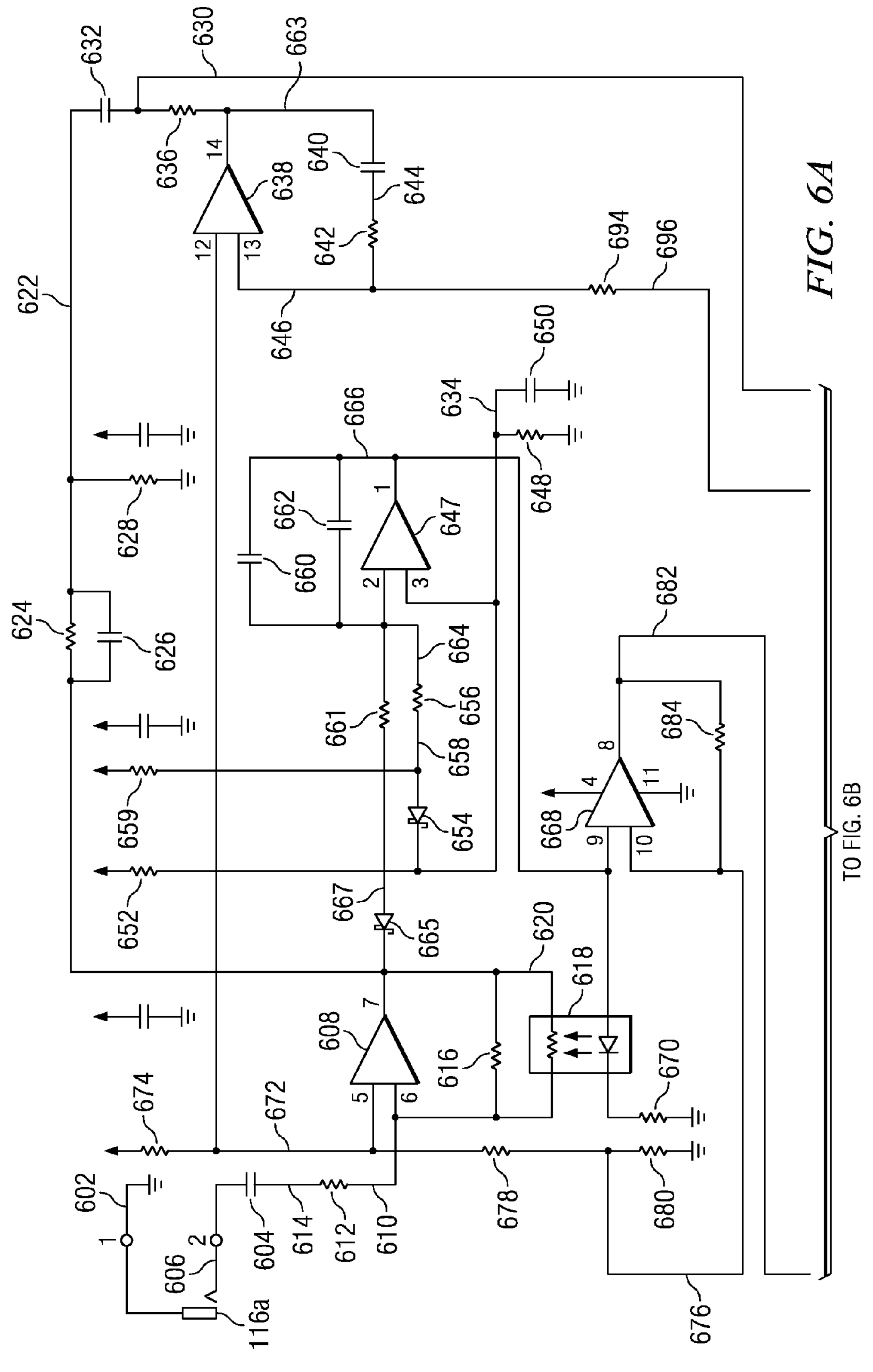
FIG. 6 illustrates a schematic diagram of one embodiment of a circuit board that may be used in the audio transmitter of FIG. 2.
Figures 6, 6B:
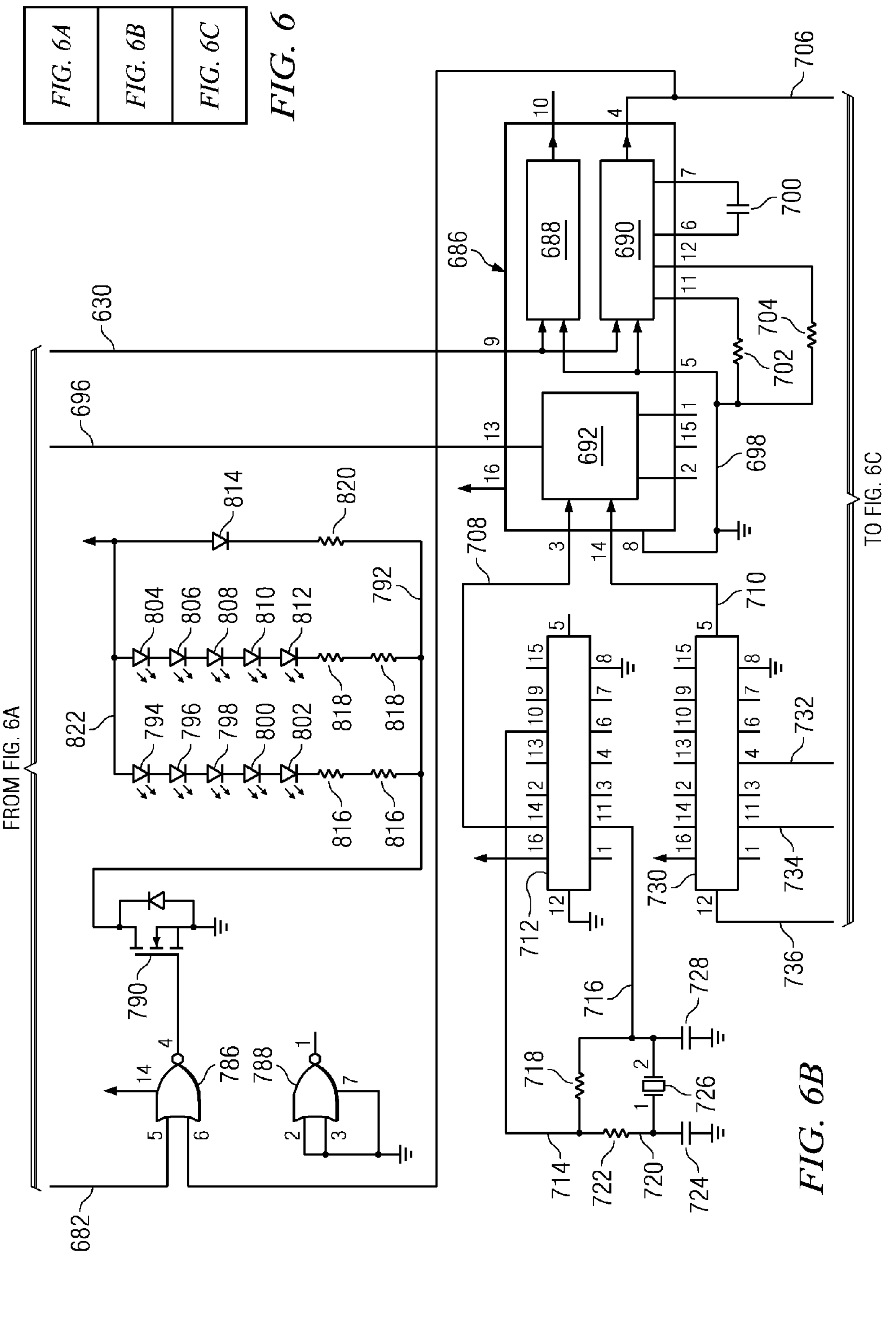
Figure 6C:
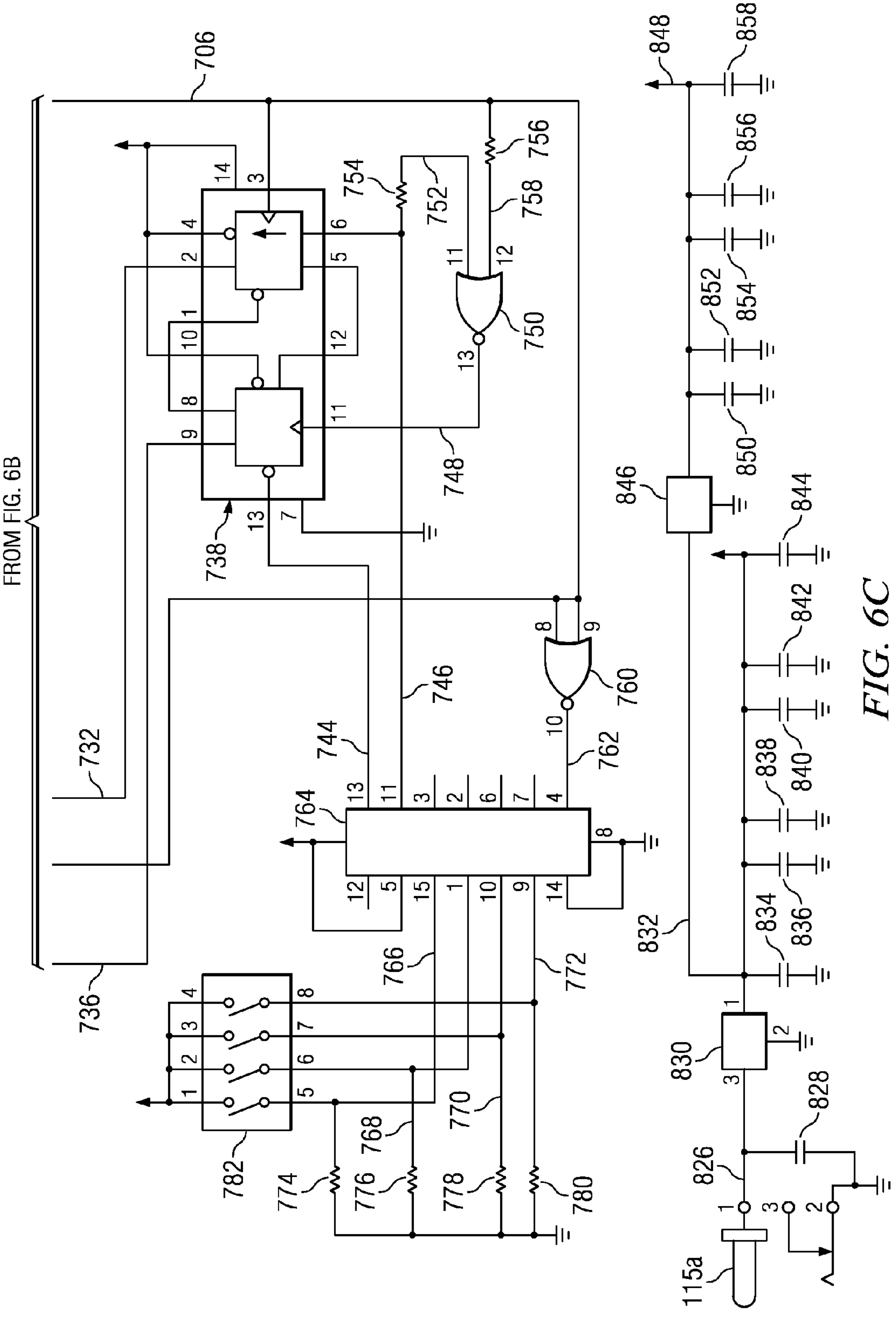

Referring to FIG. 6, a more detailed embodiment of the circuit board 202 is provided. It is understood that the circuit board 202 may be configured in many different ways and that the functionality provided by the circuit board 202 may be provided in other ways, such as one or more application specific integrated circuits (ASICs).

The circuit board 202 includes the audio input jack 116*a*, which is coupled to ground via a node 602 and to a capacitor

604 via a node 606. The negative input pin of an audio amplifier 608 is coupled to a node 610. The node 610 is coupled to a resistor 612, which is in turn coupled to the capacitor 604 via a node 614. The negative input pin of the amplifier 608 is also coupled via the node 610 to a resistor 616 and an optocoupler 618 (e.g., an NSL-32SR3). The resistor 616 and optocoupler 618 are coupled in parallel between node 610 and a node 620. The node 620 is coupled to a node 622 by a resistor 624 that is coupled in parallel to a capacitor 626. The node 622 is coupled to ground via a resistor 628 and to a node 630 via a capacitor 632.

The node 630 is coupled to a node 663 by a resistor 636 and also provides an input to a source follower 688 and voltage controlled resonator 690. The node 663 is coupled to the output pin of an amplifier 638 and to a capacitor 640. The capacitor 640 is in turn coupled in series to a resistor 642 via a node 644, and the resistor 642 is coupled to an input pin of the amplifier 638 via a node 646.

A node 634 is directly coupled to the positive input pin of an amplifier 647. The node 634 is also coupled to ground via a resistor 648 in parallel with a capacitor 650, and to a six volt voltage line via a resistor 652. The node 634 is coupled to a diode 654, which is in turn coupled to a resistor 656 via a node 658. The node 658 is coupled to a six volt voltage line via a resistor 659. The resistor 656 is coupled to parallel capacitors 660 and 662 via a node 664. The parallel capacitors 660 and 662 couple the node 664 to a node 666, which is in turn coupled to an output of the amplifier 647. The node 666 is also coupled to the optocoupler 618 and to the negative input pin of an amplifier 668. The optocoupler 618 is coupled to ground via a resistor 670.

The negative input pin of the op-amp 647 is coupled to a resistor 661 via the node 664. The node 664 is coupled via the resistor 661 to a diode 665 via a node 667, and the diode 665 is coupled to the output pin of the op-amp 608 via the node 620.

A node 672 couples the positive input pin of the amplifier 608 and an input of the amplifier 638 to a six volt voltage line via a resistor 674. The node 672 is also coupled to a node 676 via a resistor 678. The node 676 is coupled to ground via a resistor 680, to a positive input pin of the amplifier 668, and to a node 682 via a resistor 684.

As described previously, the node 630 is coupled to a source follower 688 and a voltage controlled resonator 690 that may be packaged in an IC 686. The IC 686 is an MC74HC4046ADG in the present example. The previously described node 646 may be coupled to one or more phase comparators 692 via resistor 694 and node 696.

The IC 686 includes the source follower 688, the voltage controlled resonator 690, and one or more phase comparators 692. In the present example, the node 630 is coupled to pin 9 of the IC 686 and provides an input to both the source follower 688 and the voltage controlled resonator 690. Another input for each of the source follower 688 and the voltage controlled resonator 690 is coupled to pin 8 and ground via a node 698. Pins 6 and 7 of IC 686 are coupled to one another via a capacitor 700. Pins 11 and 12 of IC 686 are coupled to node 698 via resistors 702 and 704, respectively. Pin 13 of IC 686 is coupled to previously described node 696. Pin 16 of IC 686 is coupled to a six volt voltage line. Pin 4 of IC 686 is coupled to a node 706. Inputs to the phase comparators 692 of IC 686 are received via pins 3 and 14, which are coupled to nodes 708 and 710, respectively.

IC 712, which is an SN74HC4060D in the present example, is coupled to the node 708 via pin 14. Pin 16 is coupled to a six volt voltage line and pins 8 and 12 are coupled to ground. Pin 10 is coupled to a node 714 and pin 11 is coupled to node 716. The nodes 714 and 716 are coupled to one another via a resistor 718. The node 714 is also coupled to node 720 via resistor 722, and node 720 is coupled to ground via a capacitor 724 and to a resonator 726. The node 716 is coupled to ground via a capacitor 728 and to the resonator 726.

IC 730, which is an SN74HC4060D in the present example, is coupled to the node 710 via pin 5. Pin 16 is coupled to a six volt voltage line and pin 8 is coupled to ground. Pin 4 is coupled to a node 732, pin 11 is coupled to the node 706, and pin 12 is coupled to a node 736.

An IC 738, which is an SN74HC74D in the present example, is coupled to node 732 via pin 2 and to node 736 via pin 9. Pins 4, 10, and 14 are coupled to a six volt voltage line and pin 7 is coupled to ground. Pins 1 and 8 are coupled one another, as are pins 5 and 12. Pin 13 is coupled to a node 744, pin 6 is coupled to node 746, and pin 11 is coupled to node 748. One input of a NOR gate 750 is coupled to a resistor 754 via a node 752, and the resistor 754 couples the node 752 to the node 746. The other input of the NOR gate 750 is coupled to a resistor 756 via a node 758, and the resistor 756 couples the node 758 to the node 706. The output of the NOR gate is coupled to node 748.

One input of a NOR gate 760 is coupled to the node 706 and the other input of the NOR gate 760 is coupled to the node 706. The output of the NOR gate 760 is coupled to a node 762.

An IC 764 is coupled to node 744 via pin 13, to node 746 via pin 11, and to node 762 via pin 4. Pins 5 and 16 are coupled to a six volt voltage line and pins 8 and 14 are coupled to ground. Pins 15, 1, 10, and 9 are coupled to nodes 766, 768, 770, and 772, respectively, which are coupled to ground via resistors 774, 776, 778, and 780, respectively.

Switch 782 includes pins 5, 6, 7, and 8 that are coupled to nodes 766, 768, 770, and 772, respectively. Pins 1-4 of switch 782 are coupled to a six volt voltage line.

NOR gates 786 and 788 may be packaged as part of an IC or may be separate. In the present example, they are part of a single IC (not shown) with pin numbers representing pins of the IC. NOR gate 786 includes input pin 5 coupled to node 682 and input pin 6 coupled to 706. Pin 6 is coupled to a six volt voltage line and pins 2, 3, and 7 of NOR gate 788 are coupled to ground. Output pin 4 is coupled to the gate of an n-channel metal oxide semiconductor field-effect transistor (MOSFET) 790. The source of the MOSFET 790 is grounded and the drain is coupled to a node 792.

Infrared LEDs 794, 796, 798, 800, and 802 are coupled in series, with the LED 794 being coupled to a node 822 that is in turn coupled to a ten volt voltage line. LED 802 is coupled to the node 792 via one or more resistors 816. Infrared LEDs 804, 806, 808, 810, and 812 are coupled in series, with the LED 804 being coupled to the ten volt voltage line via node 822. LED 812 is coupled to the node 792 via one or more resistors 818. An LED 814 is coupled to node 822 and is also coupled to node 792 via a resistor 820.

A voltage regulator includes the power jack **115*a* (FIG. 1) coupled to a node 826. The node 826 is coupled to ground via a capacitor 828 and to an IC 830, which is a UA7810CKCSE3 in the present example, via pin 3 of the IC. The IC 830 is coupled to a node 832 via pin 1 and to ground via pin 2. The node 832 is coupled to a plurality of parallel capacitors 834, 836, 838, 840, 842, and 844 that are grounded near the source of the MOSFET 790. The node 832 provides a ten volt voltage line. The node 832 is also coupled to the input pin of an IC 846, which is a NJM78L06# in the present example. The IC 846 is also coupled to ground and to a node 848. The node 848** is coupled to a plurality of parallel capacitors 850, 852, 854, 856, and 858 that are coupled to ground. The node 848 provides a six volt voltage line.

In operation, the circuit board 202 provides the audio transmitter 114*a* with wave generator functionality. In the present example, wave generators used to encode the audio information from the television set 102*a* may be configured to generate any one of sixteen sub-carriers of light. Three of these sub-carriers are designated wave channels #1, #2, and #3 in FIG. 1 for purposes of illustration. These sixteen sub-carriers of light are frequency modulated with the audio information that is within the range of 30-5,000 cycles per second (cps), with the wave length of the light being 870 nanometers (i.e., 3.45×1014th cps). This light is gated on and off to generate one of the sixteen sub-carriers, and each wave generator can be set to any one of the sixteen sub-carriers. It is understood that the modulation and frequency may be varied from the examples provided and that more or fewer than sixteen sub-carriers may be used.

Since the television 102*a* (and other televisions 102*b* and 102*c*) are associated with a single wave generator (i.e., a single transmitter 114*a*-114*c*), each television is associated with only one of the sixteen sub-carriers. The audio of the program being displayed by the television 102*a* is level adjusted for a wide range of input levels and is then used to frequency modulate the sub-carrier wave channels. As will be described later with respect to the audio receiver 122, each audio receiver includes a liquid crystal display (LCD) or other display (e.g., the LCD 132 of FIG. 1) that shows the wave channel (i.e., the light sub-carrier) to which the audio receiver 122 is tuned and so identifies the television to which the received sound corresponds. Each television 102*a*-102*c* (and up to sixteen televisions in the present embodiment) may have a number 1-16 displayed thereon so that a user of the audio receiver 122 can select the television to which the user would like to listen by selecting that wave number (i.e., 1-16) on the LCD display of the audio receiver 122. It is understood that more than sixteen televisions may be present if multiple televisions are set to the same wave channel number.

The audio transmitter 114*a* of the present example as described above with respect to FIG. 6 includes the following features to perform the following wave generator and control functionality: an audio input automatic gain control with fifty-three db of range, an auto shut-off dependent on audio input level, a modulation pre-emphasis, a system clock (of 3.64 MHz in the present example), a phase locked loop for sub-carrier frequency generation, a dip switch for setting wave channel number/sub-carrier, voltage regulators (e.g., 10V and 6V regulators), and infrared emitters. It is understood that the transmitter 114*a* may include more or fewer circuits and/or functions than those described.

Audio enters the transmitter 114*a* via the audio jack 116*a* and enters the negative (e.g., inverting) input of a variable gain input pre-amplifier (e.g., a pre-amp) 608. The positive (e.g., non-inverting) input is coupled to a voltage divider formed by resistors 674, 678, and 680. The input pre-amp 608 has a gain range of approximately sixty decibels in order to allow a range of input voltages from approximately ten millivolts root mean square (RMS) to ten volts RMS input to be averaged for the ideal level for modulation. This allows the input to be driven from a signal output level to headphone to speaker output from the television set 102*a*. The pre-amp 608 uses the optocoupler 618, which is formed by a variable resistance cadmium sulphide photo resistive element in conjunction with a 470 nm gallium arsenide LED, in its gain control feed-back path on node 610. Peak detection is done with a Schottky barrier diode 665.

A reference voltage is set by a resistive divider chain consisting of resistor 674, resistor 678, and resistor 680. This resistive divider chain sets up reference voltages that are applied to the positive inputs of op-amps 608, 638, and 668. Current flows through the diode 665 into the input of the voltage integrator whenever the desired reference voltage plus the forward voltage drop of the diode 665 is exceeded. This causes the output voltage of the voltage integrator to rise. The output voltage of the voltage integrator is applied in series with resistor 670 to supply current to the LED of the optocoupler 618. Accordingly, the gain of the preamp 608 may be adjusted so the average peaks of the audio correspond to the reference voltage level applied to the positive input of the voltage integrator provided by the op-amp 647.

The 3.64 MHz resonator 726 sets the time base for the wave generator of the audio transmitter 114*a*. This frequency is divided by two a total of eight times in the IC 712 for a frequency of 14218.75 cps. This sets the wave channel center to center spacing and a reference frequency for the phase locked loop that generates the sixteen sub-carriers. The approximately 14 KHz signal is applied to one input of the phase comparator 692 that is part of the IC 686. The rest of the phase locked loop is a standard configuration except for two exceptions. The first exception is that inputs PCA and PCB (i.e., pins 14 and 3, respectively) the IC 686 are reversed because the comparator output of the IC 686 is inverted in a voltage integrator provided by op-amp 638. The second exception is that the combination of the Dual 'D' flip-flop provided by IC 738, resistors 642 and 680, and the NOR gate allow one pulse to be skipped in the resetting of the IC 730. This allows the first sub-carrier to be set at 469 KHz instead of 455 KHz, which is the intermediate frequency (IF) of the receiver 114*a*. If this were not done, wave channel #1 may be unusable due to crosstalk caused by the IF in the receiver 114*a*. The output of the voltage controlled resonator 690 that is integral to IC 686 is applied through the NOR gate 786 to MOSFET 790, which in turn functions to switch the received current to two strings (i.e., string one of series coupled LEDs 794, 796, 798, 800, and 802 and string two of series coupled LEDs 804, 806, 808, 810, and 812) of 870 Nm emitters forming the emitters 206 of FIG. 2.

A voltage comparator provided by op-amp 668 senses when the input signal level is not present and switches to a high output state to inhibit the sub-carrier signal to the emitters 794, 796, 798, 800, 802, 804, 806, 808, 810, and 812. The integrator provided by op-amp 638, which has a suitably long time constant, is used to filter the comparator pulses and to accurately center each sub-carrier. The audio signal is passed thru resistors 624 and 636 and capacitor 632 as a divider to pad the signal down before being applied at node 630 to set proper bandwidth. Capacitor 626 causes some pre-emphasis of the high portions in the signal for better usage of the bandwidth. These are de-emphasized in the receiver 122. The switch 782, which is accessible via the aperture 508 in the housing 200, enables the selection of one of the wave channels 1-16.

Figure 7:
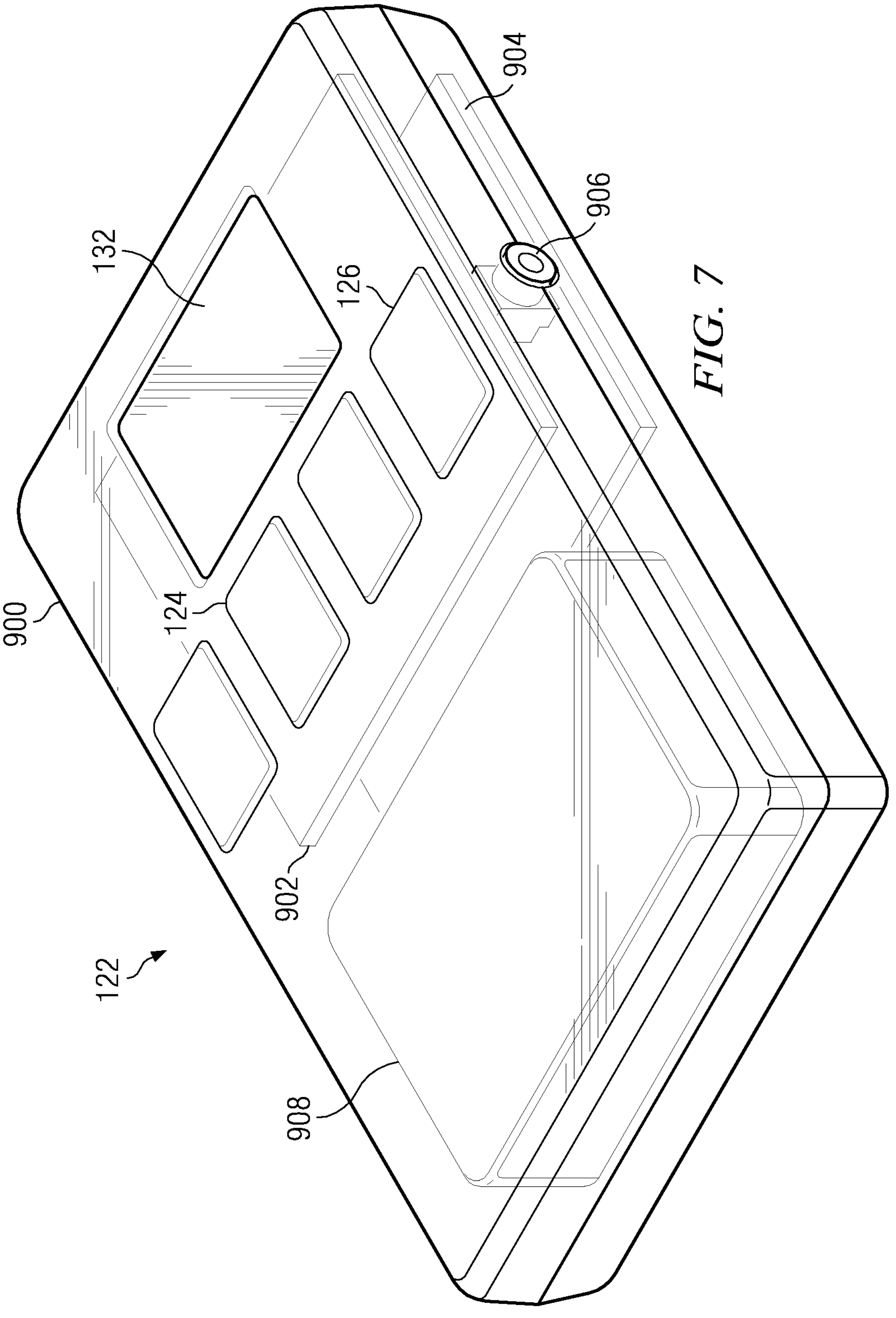
FIG. 7 illustrates one embodiment of an audio receiver that may be used in the environment of FIG. 1.

Referring to FIG. 7, a perspective view of one embodiment of the audio receiver 122 of FIG. 1 is illustrated in greater detail. The audio receiver 122 includes a housing 900 having two electrically coupled circuit boards 902 and 904 positioned therein. External connections to the circuit boards 902/904 are provided via one or more audio jacks 906. In some embodiments, the audio jack(s) 906 may be waterproof to prevent liquid from entering the housing 900 via the jack. Volume control 124 and wave channel control 126 are coupled to the circuit board 902 and, via the circuit board 902, to the circuit board 904. The LCD display 132 is also coupled to the circuit board 902. Other embodiments may include a power button and/or other control buttons that are not shown in the present example. A battery or battery pack 908 is used to provide power to the audio receiver 122. The battery 908 may be rechargeable or may simply be replaced when drained. In the present example, the battery 908 is rechargeable via charging station, which will be described in greater detail below with respect to FIGS. 12-14.

In some scenarios, multiple televisions 102*a*-102*c* may be set to the same wave channel number. Accordingly, the audio receiver 122 is configured to be somewhat directional so that a television 102*b* that is set to the same wave channel number and positioned off to the side or behind the user will not interfere with the audio being listened to by the patron from the television 102*a*. As will be described below in greater detail, due to the fact that the audio receiver 122 detects the frequency modulation of the sub-carriers, an FM capture effect tends to reject any signal operating on the same frequency that is more than six decibels less in intensity.

Figure 8:
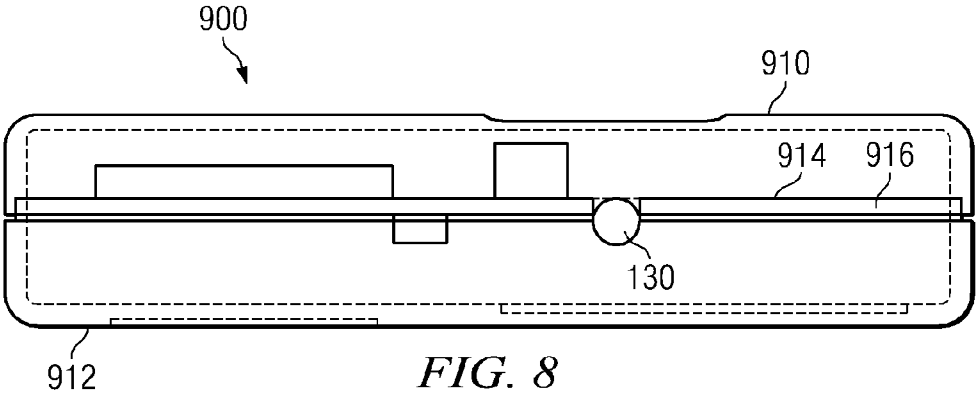
FIG. 8 illustrates a side view of one embodiment of a housing that may be used with the audio receiver of FIG. 6.

Referring to FIG. 8, a side view of one embodiment of the housing 900 of FIG. 7 is illustrated. In the present example, the housing 900 includes a top piece 910 and a bottom piece 912. The top piece 910 and bottom piece 912, which may be formed using a clear polycarbonate or any other suitable material, fit together and are coupled by fasteners (not shown) such as screws. The top piece 910 may include an indentation 914 that is configured to receive a lip or other protrusion 916 of the bottom piece 912. Also shown is the audio jack 130 (FIG. 1).

Figure 9A:
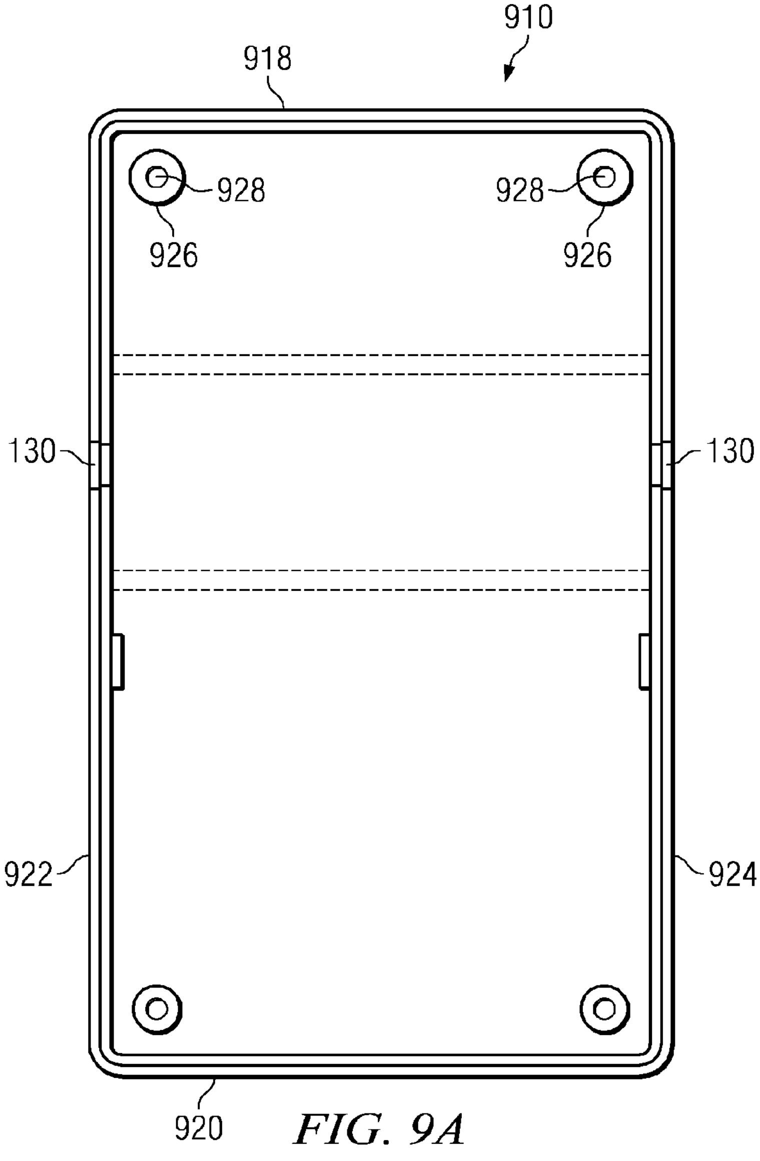
FIGS. 9A and 9B illustrate a top view and a bottom view, respectively, of the housing of FIG. 7.
Figure 9B:
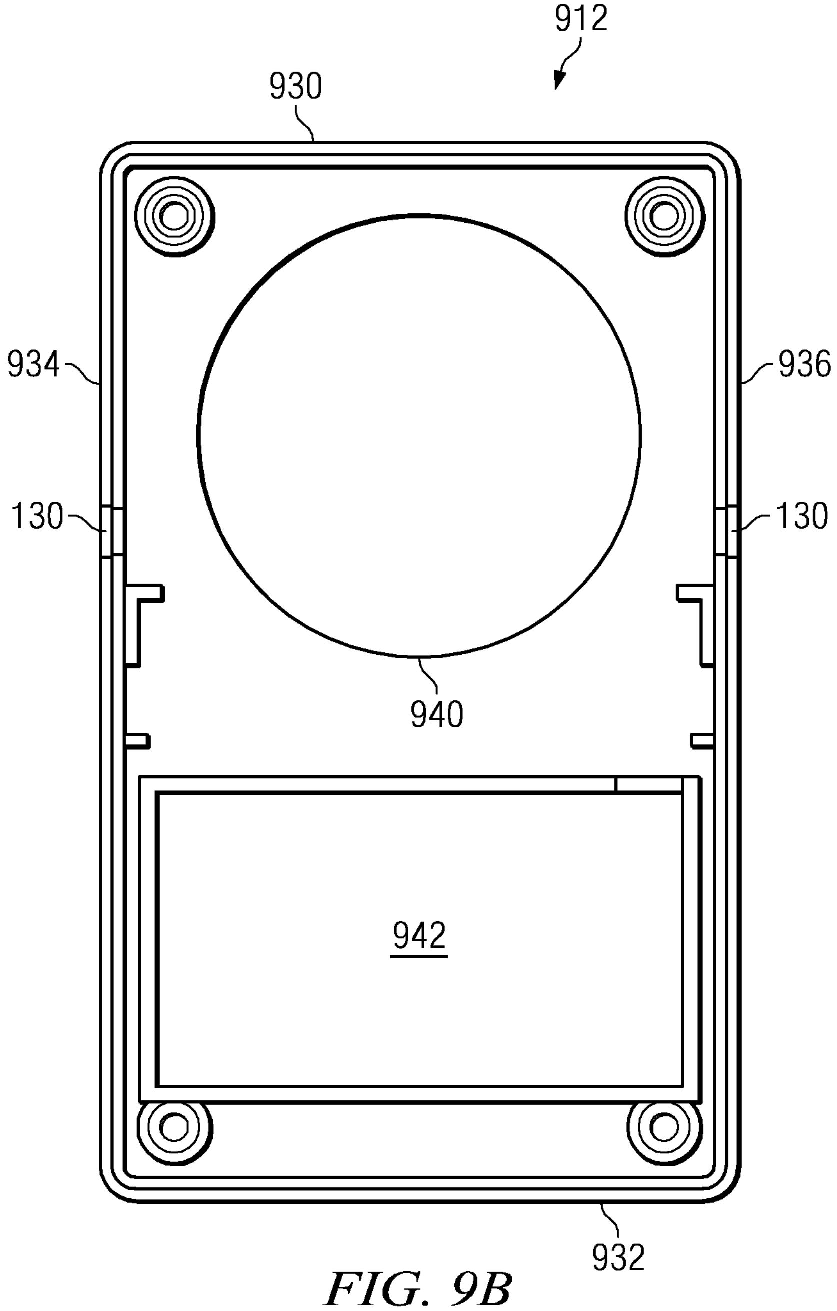

Referring to FIGS. 9A and 9B, a top view of the top piece 910 (FIG. 9A) and a bottom view of the bottom piece 912 (FIG. 9B) are illustrated. In the present example, the top piece 910 is substantially rectangular with a relatively straight front edge 918, read edge 920, and sides 922 and 924. The top piece 910 may also include one or more shafts 926 having bores 928 formed at least partly therethrough. The bores 928 are sized to receive fasteners (not shown) such as screws. The shafts 926 are aligned with apertures (FIG. 9B) in the bottom piece 912 through which the fasteners may be inserted into the bores 928 in order to fasten the top piece 910 to the bottom piece 912. The bottom piece 912 has a shape that is substantially similar or identical to the top piece 910. Accordingly, the bottom piece 912 includes a relatively straight front edge 903, read edge 932, and sides 934 and 936. Apertures 938 align with the shafts 926 of the top piece 910. It is understood that the particular shape and configuration of the housing 900 may vary and that the illustrated housing is for purposes of example only.

The bottom piece 912 also includes a space 940 for a secondary coil. As will be described later, the secondary coil is used in charging the battery 908 of the audio receiver 122. A battery compartment 942 is also provided in the bottom piece 912.

Figure 10A:
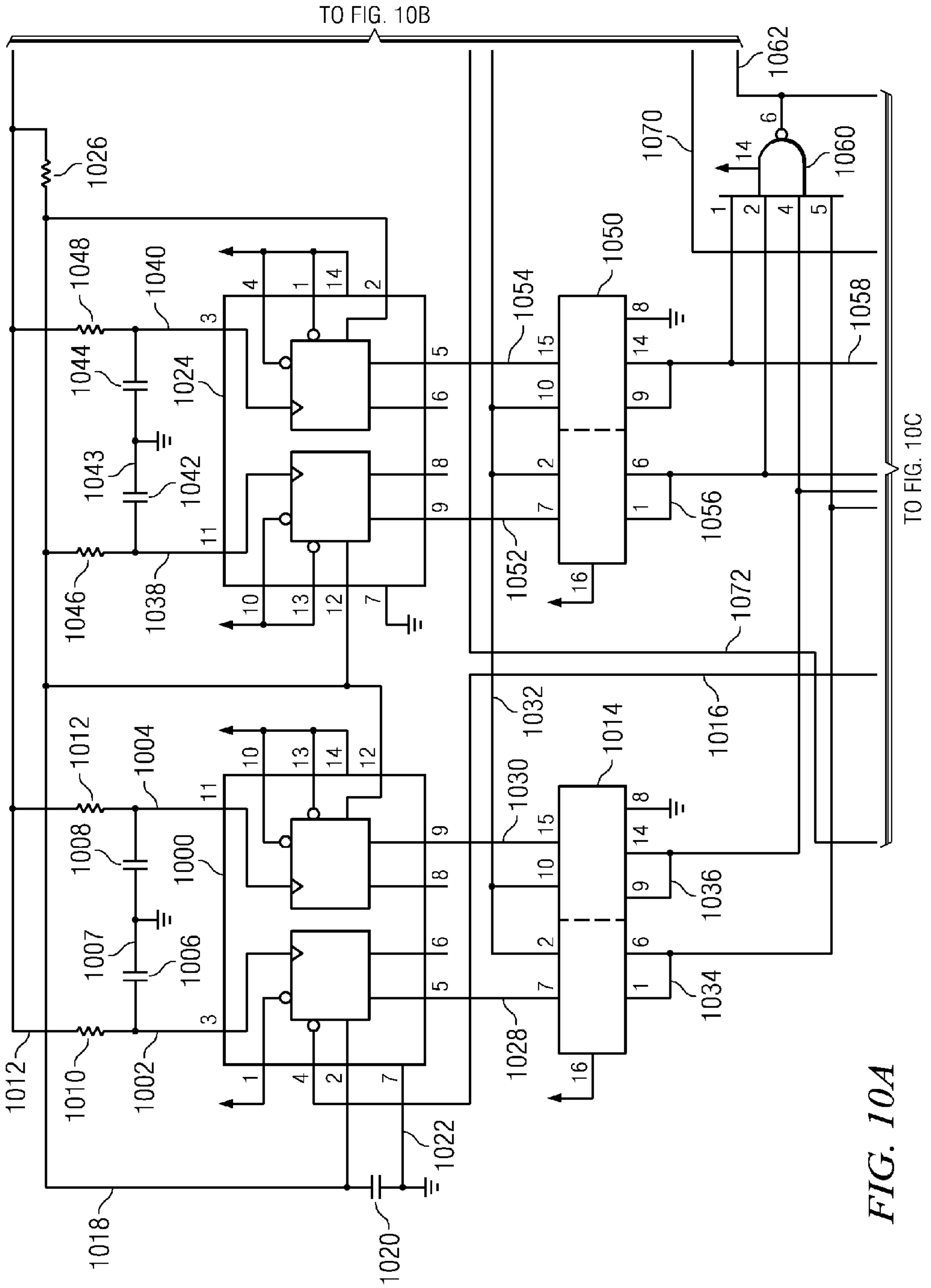
FIG. 10 illustrates a schematic diagram of one embodiment of a first circuit board that may be used in the audio receiver of FIG. 7.
Figures 10, 10B:
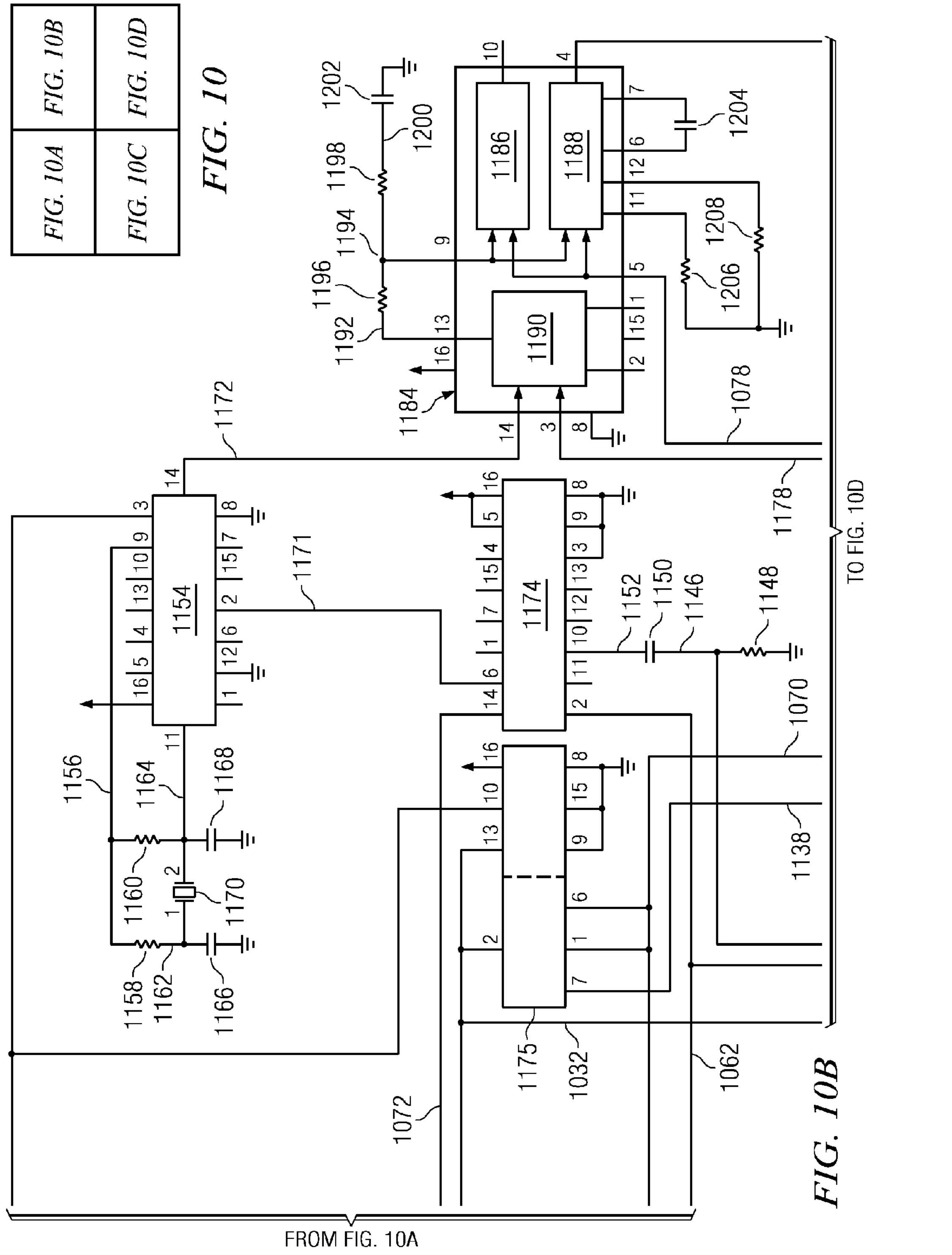
Figure 10C:
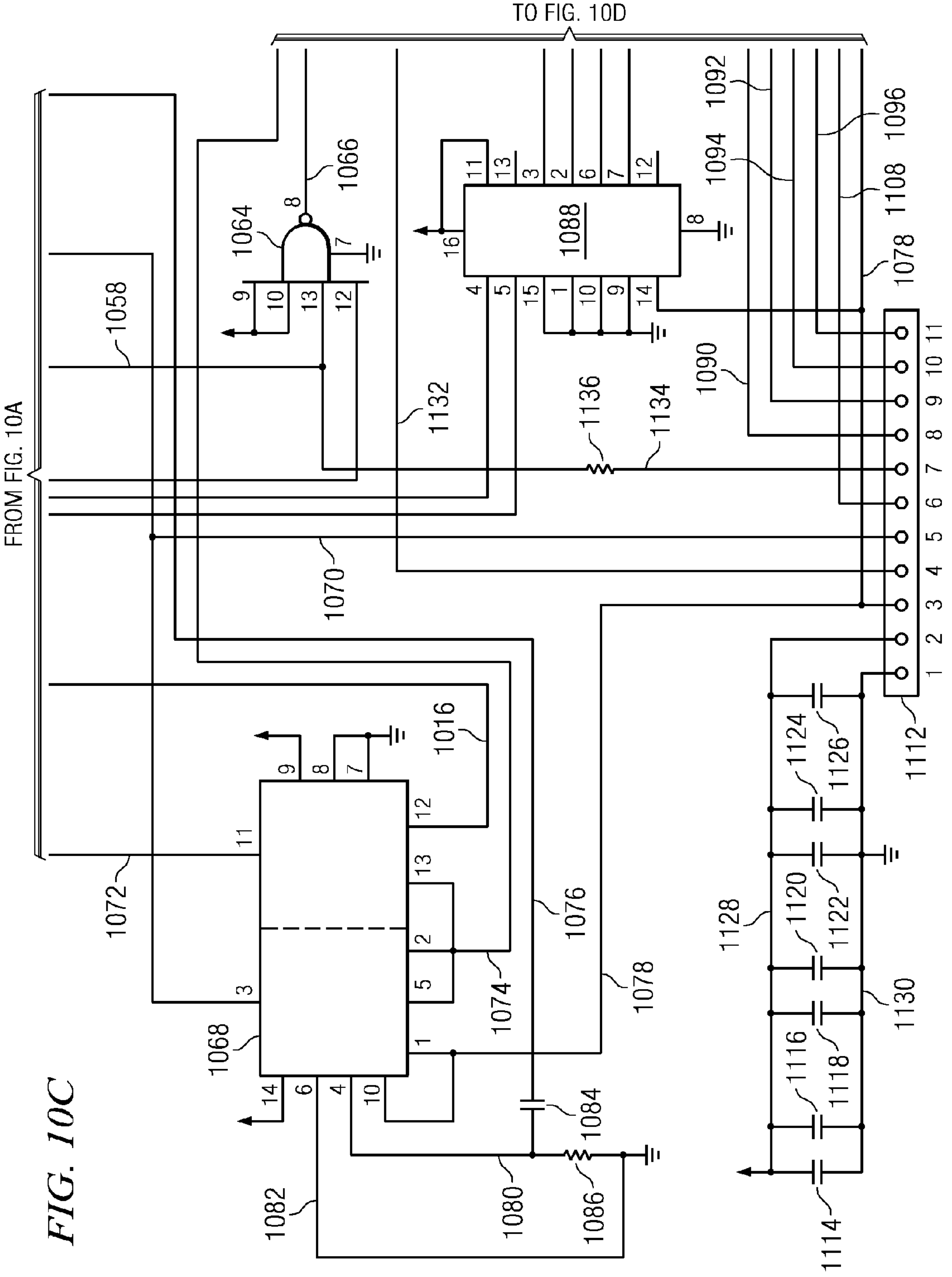
Figure 10D:
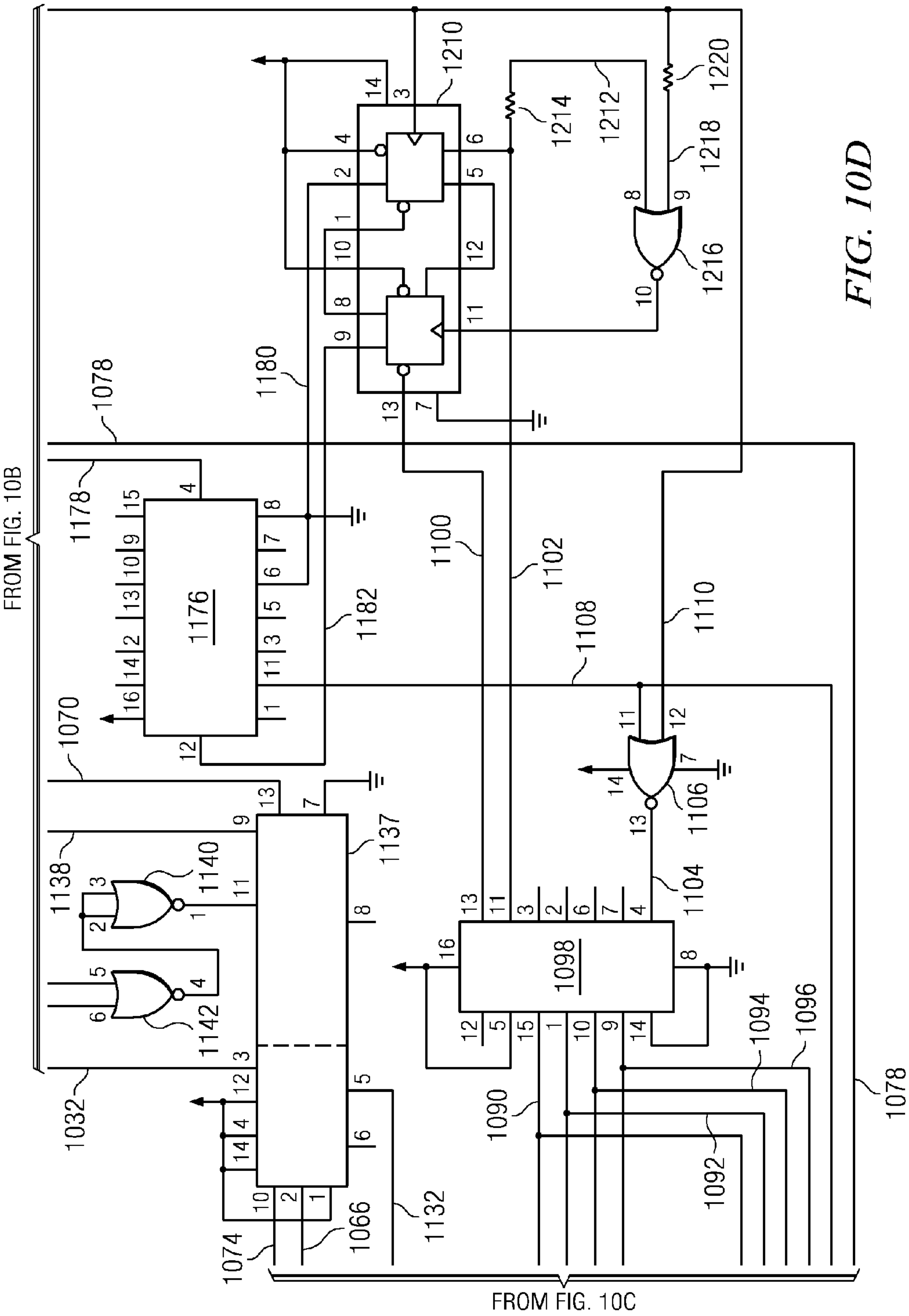

Referring to FIG. 10, a more detailed embodiment of the circuit board 902 is provided. It is understood that the circuit board 902 may be configured in many different ways and that the functionality provided by the circuit board 902 may be provided in other ways, such as one or more application specific integrated circuits (ASICs).

An IC 1000, which is a SN74HC74D in the present example, is coupled to a node 1002 via pin 3 and to a node 1004 via pin 11. Node 1002 is coupled to a capacitor 1006 and a resistor 1010, and node 1004 is coupled to a capacitor 1008 and to a resistor 1012. The capacitors 1006 and 1008 are coupled to ground via node 1007. The resistors 1006 and 1010 are coupled to a node 1012. Pins 1, 10, 13, and 14 of the IC 1000 are coupled to a five volt voltage line. Pin 7 is coupled to ground via a node 1022. Pins 5 and 9 are coupled to pins 7 and 15, respectively, of an IC 1014 via nodes 1028 and 1030. Pin 4 is coupled to a node 1016. Pins 2 and 12 are coupled to a node 1018, which is coupled to the node 1022 (and to ground) via a capacitor 1020. The node 1018 is also coupled to pins 2 and 12 of an IC 1024 and to the node 1012 via a resistor 1026.

The IC 1014, which is an M74HC4520RM13TR in the present example, is coupled to a five volt voltage line via pin 16 and to ground via pin 8. As described above, pins 7 and 15 are coupled to pins 5 and 9 of the IC 1000 via nodes 1028 and 1030, respectively. Pins 2 and 10 are coupled to a node 1032, pins 1 and 6 are coupled to a node 1034, and pins 9 and 14 are coupled to a node 1036.

The IC 1024, which is a SN74HC74D in the present example, is coupled to a node 1038 via pin 11 and to a node 1040 via pin 3. Node 1038 is coupled to a capacitor 1042 and a resistor 1046, and node 1040 is coupled to a capacitor 1044 and to a resistor 1048. The capacitors 1042 and 1044 are coupled to ground via node 1043. The resistors 1046 and 1048 are coupled to the node 1012. Pins 1, 4, 10, 13 and 14 of the IC 1024 are coupled to a five volt voltage line. Pin 7 is coupled to ground. Pins 9 and 5 are coupled to pins 7 and 15, respectively, of an IC 1050 via nodes 1052 and 1054. Pins 2 and 12 are coupled to the node 1018.

The IC 1050, which is an M74HC4520RM13TR in the present example, is coupled to a five volt voltage line via pin 16 and to ground via pin 8. As described above, pins 7 and 15 are coupled to pins 9 and 5 of the IC 1024 via nodes 1052 and 1054, respectively. Pins 2 and 10 are coupled to the node 1032, pins 1 and 6 are coupled to a node 1056, and pins 9 and 14 are coupled to a node 1058.

A NAND gate 1060 receives inputs from nodes 1058, 1056, 1036, and 1034. Pin 14 is coupled to a five volt voltage line. Output pin 6 is coupled to a node 1062.

A NAND gate 1064 receives inputs from nodes 1058 and 1056 via pins 13 and 12, respectively. Pins 9 and 10 are coupled to a five volt voltage line. Pin 7 is coupled to ground. Output pin 8 is coupled to a node 1066. It is noted that, in the present example, the NAND gates 1060 and 1064 may be part of a single IC package (not shown) and pin numbers refer to pins of the IC.

An IC 1068, which is a CD4013BM in the present example, is coupled to the node 1016 via pin 12. Pins 9 and 14 are coupled to a five volt voltage line, and pins 7 and 8 are coupled to ground. Pin 6 is also coupled to ground via node 1082. Pin 3 is coupled to a node 1070, pin 11 is coupled to a node 1072, pins 2, 5, and 13 are coupled to a node 1074, and pins 1 and 10 are coupled to a node 1078. Pin 4 is coupled to a node 1080. The node 1080 is coupled to a node 1076 via a capacitor 1084 and to the node 1082 (and ground) via a resistor 1086.

An IC 1088, which is a SN74HC193 in the present example, is coupled to node 1036 via pin 4, to node 1034 via pin 5, and to node 1078 via pin 14. Pins 1, 8, 9, 10, and 15 are coupled to ground, and pins 11 and 16 are coupled to a five volt voltage line. Pin 3 is coupled to a node 1090, pin 2 is coupled to a node 1092, pin 6 is coupled to a node 1094, and pin 7 is coupled to a node 1096.

An IC 1098, which is a SN74HC193 in the present example, is coupled to node 1090 via pin 15, to node 1092 via pin 1, to node 1094 via pin 10, and to node 1096 via pin 9. Pins 8 and 14 are coupled to ground, and pins 5 and 16 are coupled to a five volt voltage line. Pins 13 and 11 are coupled to nodes 1100 and 1102, respectively. Pin 4 is coupled to a node 1104 that couples pin 4 to the output of a NOR gate 1106.

Pin 14 of the NOR gate 1106 is coupled to a five volt voltage line and pin 7 is coupled to ground. The input pins 11 and 12 are coupled to a node 1108 and a node 1110, respectively. It is noted that, in the present example, the NOR gate 1106 may be part of a single IC package (not shown) and pin numbers refer to pins of the IC.

A connector 1112 provides an interface between the two circuit boards 902 and 904 of the audio receiver 122. Pin 1 of the connector 1112 is coupled to a node 1130 that is coupled to ground. Pin 2 is coupled to a node 1128 that is coupled to a five volt voltage line. Capacitors 1114, 1116, 1118, 1120, 1122, 1124, and 1126 are coupled in parallel between the nodes 1128 and 1130. Pin 3 is coupled to the node 1078, pin 4 is coupled to a node 1132, pin 5 is coupled to the node 1070, and pin 6 is coupled to the node 1108. Pin 7 is coupled to a node 1134, which is in turn coupled to the node 1058 via a resistor 1136. Pin 8 is coupled to the node 1090, pin 9 is coupled to the node 1092, pin 10 is coupled to the node 1094, and pin 11 is coupled to the node 1096.

An IC 1137, which is a SN74HC74D in the present example, is coupled to the node 1066 (and output pin 6 of NAND gate 1064) via pin 2. Pins 1, 4, 12, and 14 are coupled to a five volt voltage line and pin 7 is coupled to ground. Pin 10 is coupled to node 1074, pin 3 is coupled to node 1032, pin 5 is coupled to node 1132, pin 9 is coupled to a node 1138, and pin 13 is coupled to node 1070. Pin 11 is tied to the output pin 1 of a NOR gate 1140.

The NOR gate 1140 receives input via pins 2 and 3 that are both coupled to the output pin 4 of a NOR gate 1142. The NOR gate 1142 receives input via pin 6 that is coupled to the node 1062 and pin 5 that is coupled to a node 1146. It is noted that, in the present example, the NOR gates 1140 and 1142 may be part of a single IC package (not shown) and pin numbers refer to pins of the IC. Node 1146 is coupled to ground via a resistor 1148 and to a node 1152 via a capacitor 1150.

An IC 1154, which is a SN74HC4060D in the present example, is coupled to the node 1012 via pin 3. Pin 16 is coupled to a five volt voltage line and pins 8 and 12 are coupled to ground. Pin 10 is coupled to a node 1156, which is in turn coupled to parallel resistors 1158 and 1160. Resistor 1158 couples the node 1156 to a node 1162 and resistor 1160 couples the node 1156 to a node 1164. The node 1162 is coupled to ground via a capacitor 1166 and to a resonator 1170. The node 1164 is coupled to pin 11 of the IC 1154, to ground via a capacitor 1168, and to the resonator 1170. Pin 2 is coupled to pin 6 of an IC 1174 via a node 1171 and pin 14 is coupled to an IC 1184 via a node 1172.

The IC 1174, which is a MC14521BDG in the present example, is coupled to the node 1072 via pin 14, to node 1171 via pin 6, to node 1062 via pin 2, and to node 1152 via pin 10. Pins 5 and 16 are coupled to a five volt voltage line and pins 3, 8, and 9 are coupled to ground.

An IC 1175, which is a M74HC4520RM13TR in the present example, is coupled to the node 1032 via pins 2 and 13, to the node 1012 via pin 10, to the node 1070 via pins 1 and 6, and to the node 1138 via pin 7. Pin 16 is coupled to a five volt voltage line and pins 8, 9, and 15 are tied to ground.

An IC 1176, which is a SN74HC4060D in the present example, is coupled to the node 1108 via pin 11, to a node 1178 via pin 4, to a node 1180 via pin 6, and to a node 1182 via pin 12. Pin 16 is coupled to a five volt voltage line and pin 8 is coupled to ground.

The IC 1184, which is a MC74HC4046ADG in the present example, includes a source follower 1186, a voltage controlled resonator 1188, and one or more phase comparators 1190. Pin 16 of the IC 1184 is coupled to a five volt voltage line and pin 8 is coupled to ground. Nodes 1172 and 1178 provide inputs to the phase comparators 1190 via pins 14 and 3, respectively, of the IC 1184. The output of the phase comparators 1190 couples to a node 1192 via pin 13. Node 1192 is coupled to a node 1194 via a resistor 1196. The node 1194 is coupled to pin 9 and provides inputs to the source follower 1186 and the voltage controlled resonator 1188. The node 1194 is also coupled to a resistor 1198, which is in turn coupled to a capacitor 1202 via a node 1200. The capacitor 1202 is coupled to ground. Pins 6 and 7, which are coupled internally to the voltage controlled resonator 1188, are coupled to one another externally via a capacitor 1204. Pins 11 and 12 are coupled to ground via resistors 1206 and 1208, respectively. Pin 5 is coupled to node 1078, which provides inputs to the source follower 1186 and the voltage controlled resonator 1188. Output pin 4 is coupled to node 1110.

An IC 1210, which is a SN74HC74D in the present example, is coupled to the node 1110 (and therefore the output of pin 4 of the IC 1184) via pin 3. Pins 2, 9, and 13 are coupled to nodes 1180, 1182, and 1100, respectively. Pins 4, 10, and 14 are coupled to a five volt voltage line and pin 7 is coupled to ground. Pins 1 and 8 are coupled to one another. Pin 6 is coupled to node 1102, which is also coupled to a node 1212 via a resistor 1214. The node 1212 is coupled to an input pin 8 of a NOR gate 1216. It is noted that, in the present example, the NOR gate 1216 may be part of a single IC package (not shown) and pin numbers refer to pins of the IC. The other input pin 9 for the NOR gate 1216 is coupled to a node 1218, which is in turn coupled to the node 1110 via a resistor 1220. The output pin 10 of the NOR gate 1216 is coupled to pin 11 of the IC 1210.

Figure 11A:
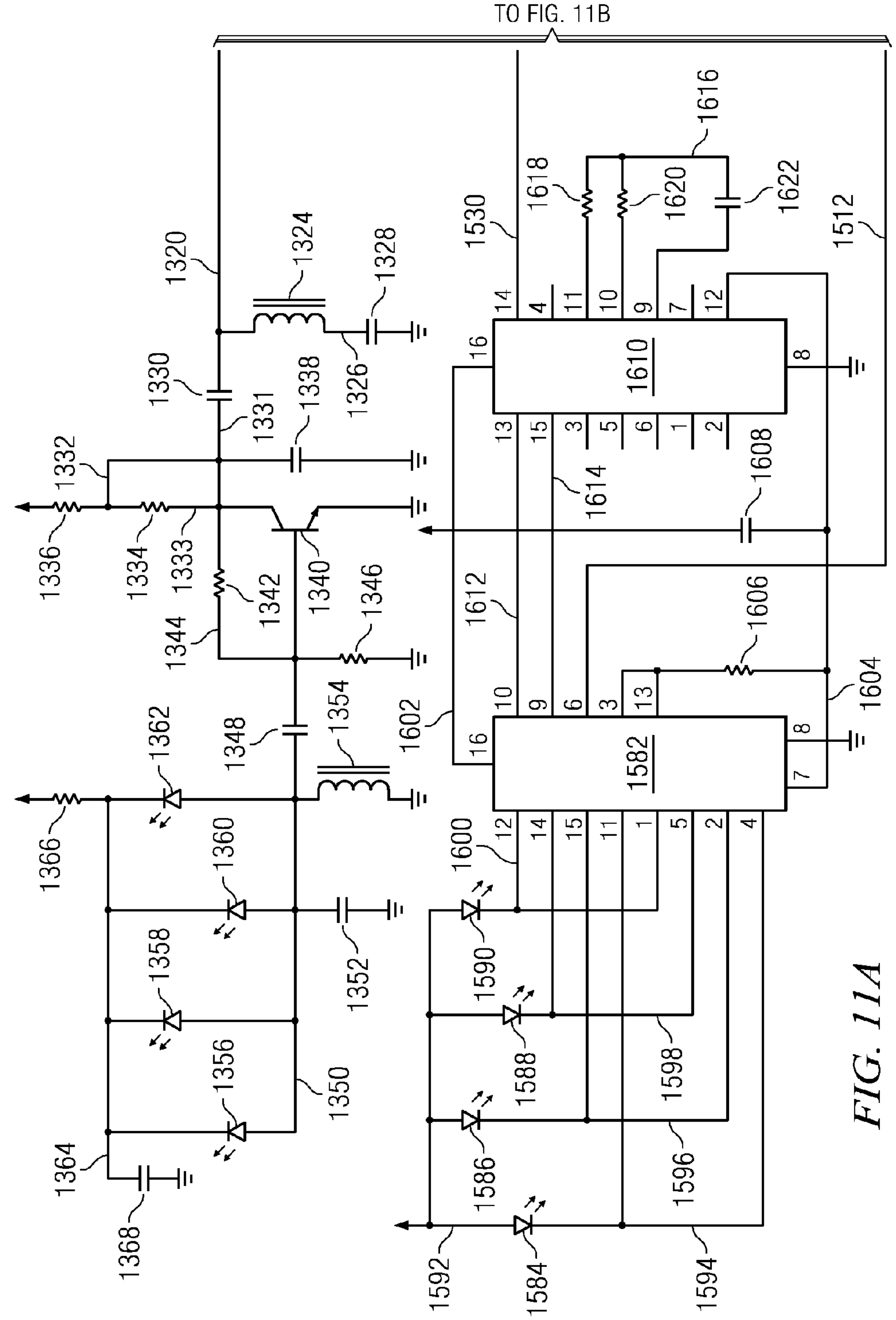
FIG. 11 illustrates a schematic diagram of one embodiment of a second circuit board that may be used in the audio receiver of FIG. 7.
Figure 11B:
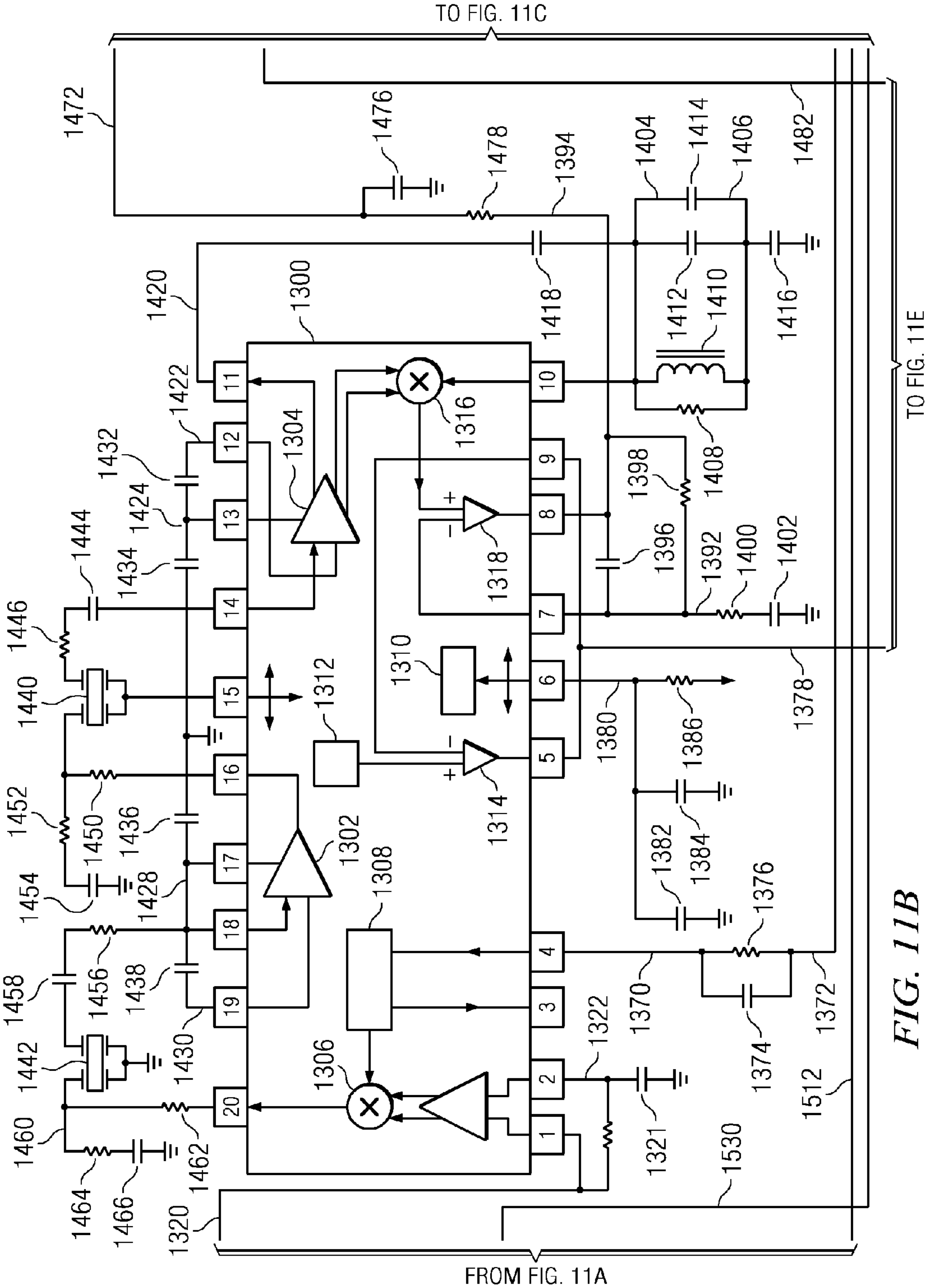
Figure 11C:
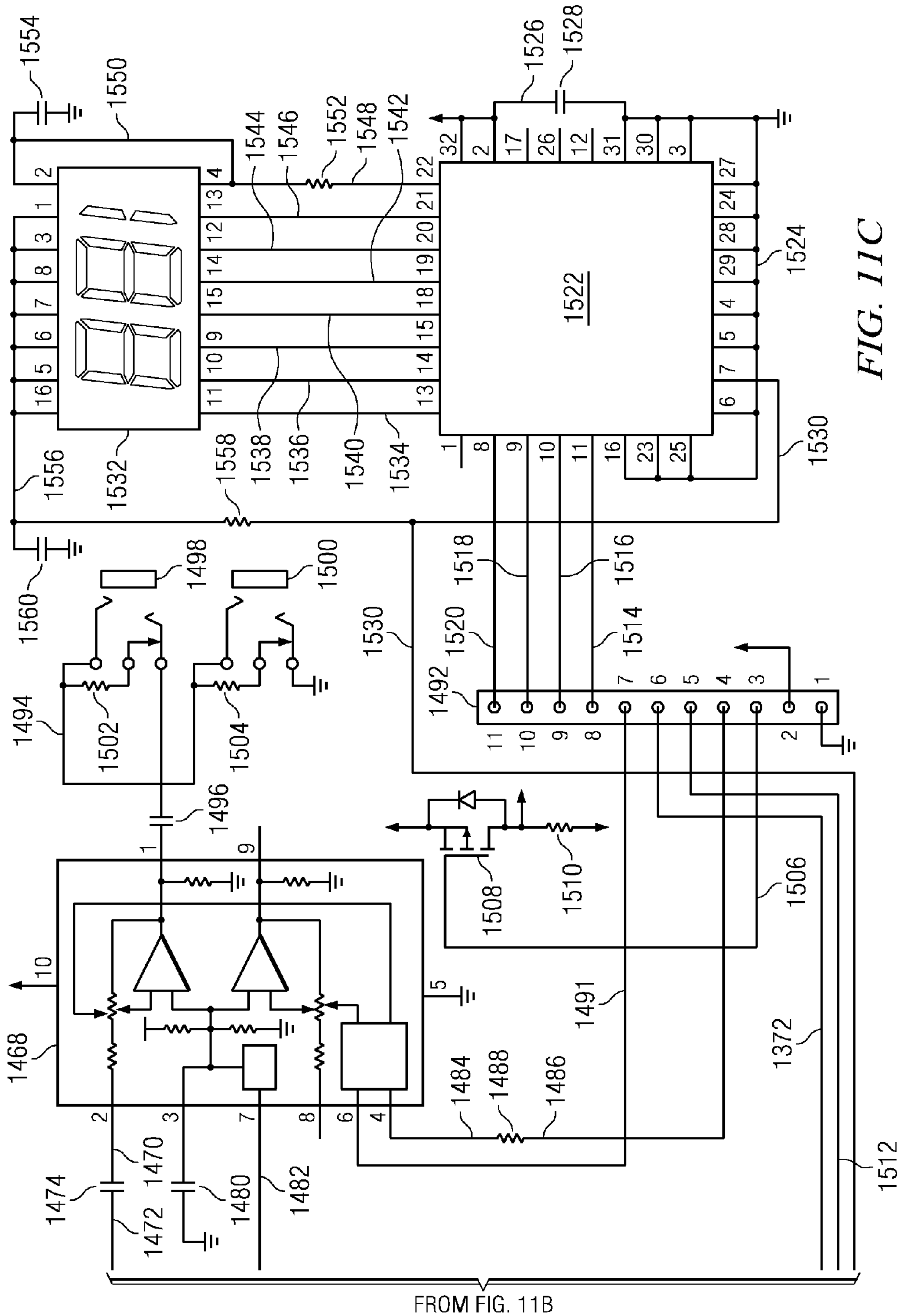
Figure 11D:
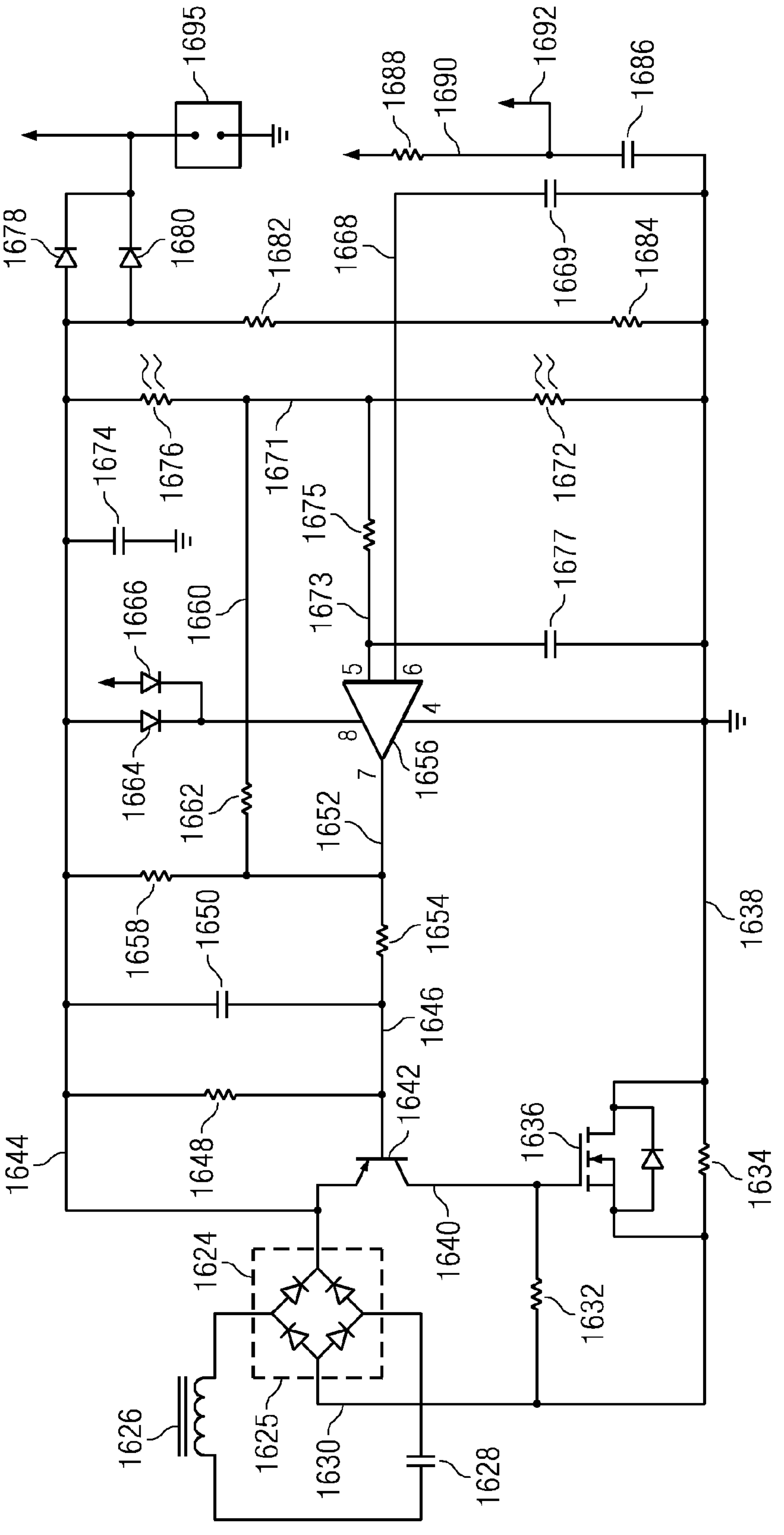
Figure 11E:
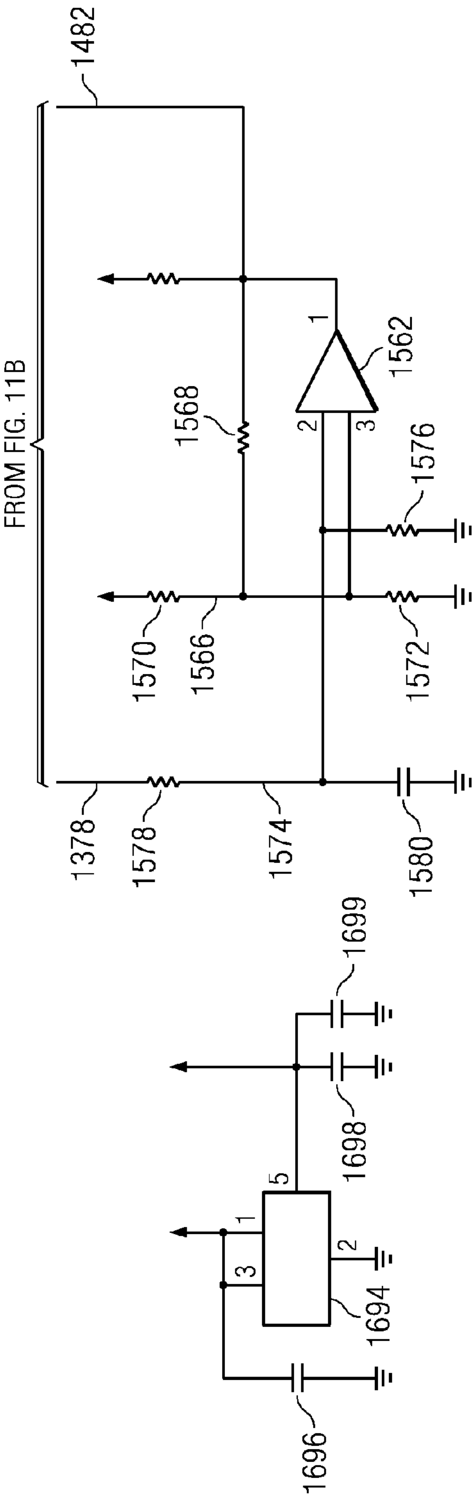
Figure 11:
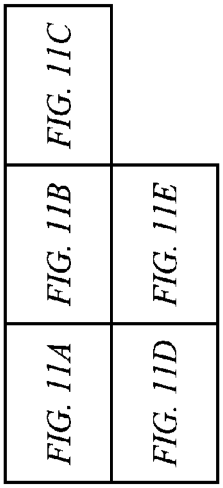

Referring to FIG. 11, a more detailed embodiment of the circuit board 904 is provided. It is understood that the circuit board 904 may be configured in many different ways and that the functionality provided by the circuit board 904 may be provided in other ways, such as one or more application specific integrated circuits (ASICs).

An IC 1300, which is a SA616DK in the present example, includes intermediate frequency (IF) amplifiers 1302 and 1304, a mixer 1306, a resonator 1308, a voltage regulator 1310, a received signal strength indicator (RSSI) 1312, an op-amp 1314 associated with the RSSI 1312, a quadrature detector 1316, and an op-amp 1318 associated with the quadrature detector 1316. Pins 1 and 2 provide input to the mixer 1306. Pin 1 is coupled to a node 1320 and pin 2 is coupled to a node 1322, which is in turn coupled to ground via a capacitor 1321.

The node 1320 is coupled to an inductor 1324, which is in turn coupled in series to a capacitor 1328 via a node 1326. The capacitor 1328 is coupled to ground. The node 1320 is also coupled to a node 1331 via a capacitor 1330. The node 1331 is coupled to a node 1344 via a resistor 1342. The node 1344 is coupled to the base of an n-channel bipolar junction transistor (BJT) 1340. The emitter of the BJT 1340 is coupled to ground and the collector is coupled to a resistor 1334 via a node 1333. The resistor 1334 is coupled to a five volt voltage line via a node 1332 that couples the resistor 1334 with a resistor 1336 that is coupled to the five volt line. The node 1332 is also coupled to ground via a capacitor 1338. The node 1344 is coupled to ground via a resistor 1346 and is coupled to a node 1350 via a capacitor 1348. The node 1350 is coupled to ground via a capacitor 1352 in parallel with an inductor 1354. The node 1350 is also coupled to a node 1364 via parallel LEDs 1356, 1358, 1360, and 1362. The node 1364 is coupled to a five volt voltage line via a resistor 1366 and to ground via a capacitor 1368.

Pin 4 of the IC 1300 is coupled to a node 1370 that is in turn coupled to a node 1372 via a capacitor 1374 coupled in parallel with a resistor 1376. Pins 5 and 9 of the IC 1300 are coupled to a node 1378. Pin 6 of the IC 1300 is coupled to a node 1380 that is coupled to ground through parallel capacitors 1382 and 1384 and to a five volt voltage line via a resistor 1386.

Pin 7 of the IC 1300 is coupled to a node 1392, which is coupled to a node 1394 via a capacitor 1396 in parallel with a resistor 1398. Node 1392 is also coupled to ground via a resistor 1400 in series with a capacitor 1402. Pin 8 is coupled to the node 1394. Pin 10 is coupled to a node 1404 and pin 11 is coupled to the node 1404 via a node 1420 and a capacitor 1418. The node 1404 is coupled to a node 1406 via a parallel arrangement of a resistor 1408, inductor 1410, and capacitors 1412 and 1414. The node 1406 is coupled to ground via a capacitor 1416.

Pin 12 is coupled to a node 1422, which is coupled to a node 1424 via a capacitor 1432. The node 1424 is coupled to pin 13 and to a node 1426 via a capacitor 1434. The node 1426 is coupled to ground and to a node 1428 via a capacitor 1436. The node 1428 is coupled to pin 17 and to a node 1430 via a capacitor 1438. The node 1430 is coupled to pin 19.

The IC 1300 is coupled to filters 1440 and 1442, which are both LTM455FU filters in the present example with a twelve KHz bandwidth centered at 455 KHz. Pin 14 is coupled to filter 1440 via a capacitor 1444 in series with a resistor 1446. Pin 15 is coupled to the filter 1440. Pin 16 is coupled to a node 1448 via a resistor 1450. The node 1448 is coupled to the filter 1440 and to ground via a resistor 1452 in series with a capacitor 1454. Pin 18 is coupled to filter 1442 via a resistor 1456 in series with a capacitor 1458. Pin 20 is coupled to a node 1460 via a resistor 1462. The node 1460 is coupled to the filter 1442 and to ground via a resistor 1464 in series with a capacitor 1466.

An IC 1468, which is an LM4811 audio amplifier in the present example, is coupled to a node 1470 via pin 2. Node 1470 is coupled to a node 1472 via a capacitor 1474. Node 1472 is coupled to ground via a capacitor 1476 and to the node 1394 via a resistor 1478. Pin 3 is coupled to ground via a capacitor 1480. Pin 7 is coupled to a node 1482. Pin 4 is coupled to a node 1484, which is in turn coupled to a node 1486 via a resistor 1488. The node 1486 is coupled to pin 4 of a connector 1492 that is coupled to the connector 1112 of the circuit board 902 of FIG. 10. Pin 6 of the IC 1468 is coupled to pin 7 of the connector 1492 via node 1491. Pin 10 is coupled to a five volt voltage line and pin 5 is coupled to ground. Pin 1 of the IC 1468 is coupled to a node 1494 via a capacitor 1496. The node 1494 is coupled to audio jacks 1498 and 1500, which are associated with resistors 1502 and 1504, respectively.

The connector 1492 is coupled to ground via pin 1 and to a five volt voltage line via pin 2. Pin 3 of the connector 1492 is coupled to a node 1506 that is in turn coupled to the gate of a MOSFET 1508. The source of the MOSFET 1508 is coupled to a five volt voltage line. The drain of the MOSFET 1508 is coupled to a five volt voltage line directly and via a resistor 1510. Pin 4 of the connector 1492 is coupled to the node 1486, pin 5 is coupled to a node 1512, pin 6 is coupled to the node 1372, pin 7 is coupled to the node 1491, and pins 8-11 are coupled to nodes 1514, 1516, 1518, and 1520, respectively.

An IC 1522, which is a AT27C256R-70JU in the present example, is coupled to the nodes 1514, 1516, 1518, and 1520 via pins 11, 10, 9, and 8, respectively. Pins 3-6, 16, 23-25, and 27-31 are coupled to a node 1524, which is coupled to ground. Pins 2 and 32 are coupled to a five volt voltage line via a node 1526. Nodes 1524 and 1526 are coupled to one another via a capacitor 1528. Pin 7 is coupled to a node 1530. Pins 13-15 and 18-22 are coupled to an LCD 1532.

The LCD 1532 is coupled to pins 13, 14, 15, 18, 19, 20, 21, and 22 of the IC 1522 via pins 11, 10, 9, 15, 14, 12, 13, and 4, respectively. More specifically, a node 1534 couples pin 13 of the IC 1522 with pin 11 of the LCD 1532. A node 1536 couples pin 14 of the IC 1522 with pin 10 of the LCD 1532. A node 1538 couples pin 15 of the IC 1522 with pin 9 of the LCD 1532. A node 1540 couples pin 18 of the IC 1522 with pin 15 of the LCD 1532. A node 1542 couples pin 19 of the IC 1522 with pin 14 of the LCD 1532. A node 1544 couples pin 20 of the IC 1522 with pin 12 of the LCD 1532. A node 1546 couples pin 21 of the IC 1522 with pin 13 of the LCD 1532. A node 1548 couples pin 22 of the IC 1522 with a resistor 1552, which in turn couples the node 1548 to a node 1550 and pin 4 of the LCD 1532. The node 1550 is also coupled to pin 2 and to ground via a capacitor 1554. Pins 1-3, 5-8, and 16 are coupled to a node 1556. The node 1556 is coupled to the node 1530 via a resistor 1558 and to ground via a capacitor 1560.

An op-amp 1562 is coupled to the node 1482 via output pin 1. In addition to being coupled to pin 7 of IC 1468 as described previously, the node 1482 is coupled to a five volt voltage line via a resistor 1564 and to a node 1566 via a resistor 1568. The node 1566 is coupled to a five volt voltage line via a resistor 1570, to ground via a resistor 1572, and to the positive input pin of the op-amp 1562. The negative input pin of the op-amp 1562 is coupled to a node 1574. The node 1574 is coupled to ground via resistor 1576 in parallel with a capacitor 1580 and to the node 1378 via a resistor 1578.

An IC 1582, which is a CD74HC4052M in the present example, is coupled to an LED 1584 via a node 1594 that is coupled in turn to pins 4 and 11. Pins 2 and 15 are coupled to a node 1596, which is in turn coupled to an LED 1586. Pins 5 and 14 are coupled to a node 1598, which is in turn coupled to an LED 1588. Pins 1 and 12 are coupled to a node 1600, which is in turn coupled to an LED 1590. LEDS 1584, 1586, 1588, and 1590 are also coupled to a five volt voltage line via a node 1592. Pin 16 of the IC 1582 is coupled to a five volt voltage line via a node 1602. Pin 8 is coupled to ground. Pin 7 is coupled to a node 1604, which is in turn coupled to the node 1602 via a capacitor 1608. Pins 3 and 13 are coupled to the node 1604 via a resistor 1606. Pin 10 is coupled to pin 13 of an IC 1610 via a node 1612 and pin 9 is coupled to pin 15 of the IC 1610 via a node 1614.

The IC 1610, which is a SN74HC4060D in the present example, is coupled to the IC 1582 as described above via pins 9 and 13. Pin 16 is coupled to the node 1602 (and to the associated five volt voltage line) and pin 12 is coupled to the node 1604. Pin 8 is coupled to ground. Pin 14 is coupled to the node 1530. Pins 11, 10, and 9 are coupled to one another via a node 1616 and are coupled to the node 1616 via a resistor 1618, a resistor 1620, and a capacitor 1622, respectively.

A battery management circuit in the lower board includes small signal diode ICs 1624 and 1625, each of which contains two small signal diodes. The AC pins of the ICs 1624 and 1625 are coupled via an inductor 1626 and a capacitor 1628 that provide series resonance. The A pins of the ICs 1624 and 625 are coupled to a node 1630 that is in turn coupled to a resistor 1632, a resistor 1634, and the source of an n-channel MOSFET 1636. The resistor 1634 and drain of the MOSFET 1636 are coupled to a node 1638. The resistor 1632 and gate of the MOSFET 1636 are coupled to a node 1640, which is in turn coupled to the collector of a p-channel BJT 1642. The emitter of the BJT 1642 is coupled to a node 1644 and the C pins of the ICs 1624 and 625, and the base is coupled to a node 1646. The node 1646 is coupled to the node 1644 via resistor 1648 in parallel with a capacitor 1650. The node 1646 is also coupled to a node 1652 via a resistor 1654.

The output pin of an op-amp 1656 is coupled to the node 1652. The node 1652 is also coupled to the node 1644 via a resistor 1658 and to a node 1660 via a resistor 1662. The voltage pin of the op-amp 1656 is coupled to the node 1644 via a diode 1664 and to a five volt voltage line via a diode 1666. The node 1660 is coupled to the node 1638 via a thermistor 1672. The node 1660 is also coupled to a node 1673 via a resistor 1675, and the node 1662 is coupled to the positive input pin of the op-amp 1656 and to the node 1638 via a capacitor 1677. The negative input of the op-amp 1656 is coupled to a node 1668, which is in turn coupled to the node 1638 via a capacitor 1669.

The node 1644 is coupled to a node 1671 via a thermistor 1676 (which may be positioned in or near a battery case rather than on the circuit board 904), and to ground via a capacitor 1674 and to a pickup coil connector 1645 via parallel diodes 1678 and 1680. The pickup coil connector 1645 couples to a pickup coil (not shown) on the opposite side of the circuit board 904. The node 1644 is also coupled to the node 1638 via one or more resistors 1682 and 1684 (which may be combined in some embodiments). The node 1638 may be coupled to a node 1690 via a capacitor 1686. The node 1690 may in turn be coupled to a five volt voltage line via a resistor 1688 and to an audio amplifier feed 1692.

A voltage regulator circuit may include an IC 1694, which is a LP2980 in the present example, with pins 1 and 3 coupled to ground via a capacitor 1696 and to a battery (not shown). Pin 2 is coupled directly to ground. Pin 5 is coupled to a five volt voltage line to provide power and to ground via parallel capacitors 1698 and 1699.

In operation, the receiver 122 may be viewed as a single conversion unit in that the input frequency is down converted by a signal injection mixer only once, but an initial down conversion takes place in the front end of the receiver 122 by pin diodes 1356, 1358, 1360, and 1362 that convert the infrared light to a direct current (DC) level. Since the light is gated on and off in the transmitters 114*a*-114*c*, the pin diode frequency output is a DC level that varies with the sub-carriers.

The audio receiver 122 of the present example as described above with respect to the circuit board 904 of FIG. 10 includes the following features to perform the following wave generator and control functionality: a self biasing preamplifier, a single conversion receiver chip with quadrature audio detector, a de-emphasis network, a dual channel audio amplifier, a five volt low drop-out voltage regulator, a battery charging and management circuit, an "off" state electronic shutdown circuit, an LCD display drive circuit, a pickup coil resonator for charging system, an resonator for a four LED visual display that doubles as LCD display switching signal, and a multiplexer for the LED lights.

The circuit board 904 includes four pin diodes 1356, 1358, 1360, and 1362 positioned at the "front" of the housing 900. The light waves that are transmitted from the transmitter 114*a* are received by the receiver 122 via the four pin diodes 1356, 1358, 1360, and 1362. These diodes 1356, 1358, 1360, and 1362 convert the light waves to a constant current level depending on the intensity of the light. Since the light is chopped at the transmitter 114*a* into sub-carrier pulses, the current is also pulsed at this rate. The diodes 1356, 1358, 1360, and 1362 are back biased to optimum sensitivity voltage. Since the diodes 1356, 1358, 1360, and 1362 are current devices, the parallel configuration is used to enhance signal to noise ratio. An inductor 1354 is used to filter out interference that may be cause by the 120 pulses per second of incandescent lamps in the ambient area. These cause slight differences in back bias and sensitivity at a 120 cps rate. The inductor 1354 also removes, to a certain extent, low frequency spurious signals.

The current pulses produced by the diodes 1356, 1358, 1360, and 1362 are applied through a DC blocking capacitor 1348 to a single stage self biasing amplifier 1340. An inductor 1324 and a capacitor 1328 are used to block unwanted harmonic signals in the amplifier 1340 from entering the mixer 1306 in the IC 1300. Instead of using an oscillator for injection to the mixer 1306, signals from the circuit board 902 are injected at pin 4 of the IC 1300. The quadrature demodulation uses a power line type of filter inductor 1410 instead of a tunable coil, which may provide space and cost savings. Capacitors 1396 and 1476 may form at least a portion of an audio de-emphasis circuit.

In the present example, only one channel of the audio amplifier 1468 is used to save power consumption as any headsets (not shown) connected via connectors 1498 and 1500 will be in series. Resistors 1502 and 1504 are dummy series loads in case only one headset is in use. Voltage comparator 1562 compares the signal strength output from the IC 1300 to a preset reference for squelching the audio amplifier 1468.

The LCD 1532 is used upside down to center the digits since only one and a half of the digits are used. Segments E and F of digit three are used as the 1 for wave channel selection 10-16. Resistors 1552 and 1558 and capacitors 1554 and 1560 are used to remove sharp edges from the 50 Hz waveform for the LCD to prevent capacitive coupling into the receiver section that is positioned directly under the LCD on the circuit board 902.

The IC 1522 is a static ram module used as a driver for the LCD 1532. It effectively converts 0-15 binary data to 1-16 seven segment display data. Address lines A0-A3 (e.g., pins 11, 10, 9, and 8, respectively) are addressed by the binary data to be displayed. This block of sixteen eight-bit words is then inverted and placed in the next block of memory. Address line A4 is then tied to the backplane of the LCD 1532 so the active 50 Hz inversion switching that is needed to run the display can work without a display driver chip. A free running oscillator formed by the IC 1610, resistors 1618 and 1620, and capacitor 1622 is divided down to 50 Hz to switch the LCD 1532, the memory of the IC 1522 when the receiver 122 is on, and also to run the glittering LEDs 1584, 1586, 1588, and 1590 whenever a touch pad is activated. The LEDs 1584, 1586, 1588, and 1590 are driven by a four channel analog multiplexer provided by the IC 1582 that gets addressed by this oscillator divider chain. Since only one LED is active at a time, the resistor 1606 is the only current limiting component needed for the LEDs 1584, 1586, 1588, and 1590. The IC 1582 is gated on and off by a 300 ms pulse from the circuit board 902. The MOSFET 1508 is a power switch in-line with the output of the voltage regulator 1694. The rest of the circuitry is comprised of components such as the pickup coil, rectifier, and battery management.

The battery management circuitry can draw power from the five volt voltage regulator 1694 when the receiver 122 is turned on or from the charging coil if the receiver 122 is switched off. The IC providing the op-amps 1562 for squelch and 1656 for battery voltage sensing is a dual voltage comparator IC and is powered when either charging the battery or when the receiver 122 is turned on. The diode array formed by diodes 1664 and 1666 allows this to happen. The diode array formed by diodes 1678 and 1680 allows power from the pickup coil to charge the battery but prevents the battery from discharging quickly when the rest of the receiver 122 is turned off. When the circuitry senses that the battery is fully charged, the resistor 1634 will supply a trickle charge of five milliamps to the battery. MOSFET 1636 acts as a switch to open and close the connection to the rectified output from the pickup coil. When the MOSFET 1636 is turned on, the pickup coil and capacitor 1580 pull the pickup coil and a sending coil from a charging station into resonance at 16384 Hz as set up in the charging station (described later).

Approximately ninety milliamps flows to the battery while it is charging. The battery in the present example is a five cell nickel-metal hydride (NiMH) battery pack. Charging occurs only when the receiver 122 is in the charging station. The thermistor 1672, which is positioned on the circuit board 904, provides a reference for the thermistor 1676, which is positioned in the battery pack. Charging occurs until there is a temperature difference (e.g., a differential of eleven degrees) between the thermistors 1672 and 1676, at which time the MOSFET 1636 switches off and the battery receives a trickle charge of five milliamps.

When the receiver 122 is turned off, the circuit board 902 continues to scan for input although the phase locked loop is disabled on the circuit board. The standby discharge rate is 800 microamps in the off state. The five milliamp trickle charge is the remaining current available to the battery after the 0.8 milliamps is subtracted.

The audio receiver 122 of the present example as described above with respect to the circuit board 902 of FIG. 10 includes the following features to perform the following wave generator and control functionality: a phased locked loop for generating the injection signals, a touch-pad proximity detection system, an up-down counter for control of the display drive on the main PCB, a 3.64 MHz resonator for the system clock, and an automatic shut down timer.

The phase locked loop of the circuit board 902 is identical to the one in the wave generator of the audio transmitter 114*a* with two exceptions. The wave generator of the audio transmitter 114*a* has to generate sub-carriers from wave channel #1 through wave channel #16 from 469,218.75 Hz to 682,500 Hz in 14218.75 Hz steps. The circuit board 902 must generate all of these signals for injection to the mixer 1306 in the IC 1300. To get a difference of 455,000 Hz, these signals have to be the sub-carrier frequency plus 455 KHz or 924218.75 Hz-1137500 Hz in 14218.75 Hz steps. In order to do this, one additional divide by two is tapped off of the loop counter at pin 4 of the IC 1098. This is Q6 output on the counter whereas Q5 output is used on the wave generator loop. The other difference is that in the wave generator of the transmitter 114*a*, the wave selection is set by the dip switch 782. On the circuit board 902, an electronic up/down counter is pulsed from the touch pad circuitry to select the injection frequency. A voltage controlled resonator in the IC 1137 is trimmed with different values to allow it to oscillate at the higher frequency.

The touch pad operation is capacitive in nature and provided for wave channel selection via capacitors 1006 and 1008 and for volume by capacitors 1042 and 1044. A 222 Hz square wave is tapped off the frequency divider provided by the IC 1154. This signal is applied to both the data and clock inputs of the ICs 1016 and 1024. Resistor 1026 and capacitor 1020 set a delay in the 0 to 1 state transition applied to the four data inputs of the ICs 1016 and 1024. The ICs 1016 and 1024 are 'D' type flip flops that are positive edge triggered. The same signal is applied to the positive edge trigger inputs with a little less of a delay.

Printed areas on the circuit board 902 function as variable capacitance touch pads. If no finger is present on the pad area, the '0' state data will still be present at the data inputs and will be transferred to the 'Q' outputs (i.e., pins 5 and 9 of the ICs 1016 and 1024). As soon as a finger is present, the capacitance increases on the clock inputs and the clock transition occurs after a logic '1' is present at the data inputs, thereby placing a '0' logic state at the QNOT outputs. This state will remain as long as the finger is present. ICs 1014 and 1050 are four bit binary counters. These counters are reset every time the Q outputs of the ICs 1016 and 1024 go high. Once the reset pin goes low as a finger is removed from a touch pad, the counters will advance until the Q4 (e.g., pin 6) outputs go high, thereby preventing the enable inputs from being used as a clock. These outputs remain low for 288 milliseconds after the finger is removed, thereby effectively "de-bouncing" the touchpads. Resistors 1010, 1012, 1046, and 1048 are selected to balance the touch pad sensitivity by compensating for different stray capacitances on the circuit board 902. Resister 1026 can be adjusted for collective sensitivity. Accordingly, in the present example, the touch pad's action occurs when the finger is removed, although LEDs may light when the touch pads are bridged. Touching any of the touch pads may turn on the audio receiver 122. It is understood that the touch pads and/or LEDs may be configured differently and may trigger when the touch pads are bridged, when a bridge is removed, when bridged for a defined period of time, or based on other criteria.

The IC 1068 provides a 'D' type flip flop (with positive set and preset) that is used as a staging memory device for the auto-shutdown process. This lets the LEDs 1584, 1586, 1588, and 1560 of the circuit board 904 glitter before the receiver 122 shuts off. The other half of the IC 1068 reflects the "ON" or "OFF" state of the receiver 122. All touch pads are active when the receiver 122 is powered down and any touch pad can be used to turn the receiver 122 back on. Since the 'Q' outputs (i.e., pins 2, 3, 6 and 7) of the IC 1088 are also used to address the display memory of the IC 1522 of the circuit board 904 as well as to set the loop frequency, the outputs are set to a '0' state when the audio receiver 122 is off. This is due to the fact that the static memory on the circuit board 904 is powered down at this time and the addresses of the RAM of the IC 1522 cannot be driven to a '1' state. When powering up, the receiver 122 always comes up on wave channel #1 and with a midrange volume. The up/down counter is reset to '0' whenever the receiver 122 is shut off and the phase lock loop IC 1184 is also disabled to save power in the 'OFF' state Pin 6 of the IC 1175 enables the LED driver on the circuit board 904 for 288 milliseconds every time a finger is removed from a touch-pad. The IC 1174 is a timer IC used to turn off the receiver 122 in eighty minutes after the last touch pad operation. The Q18 output (pin 10) of the IC 1174 is used to glitter the LEDs 1584, 1586, 1588, and 1590 every ten minutes while the unit is in operation. It is understood that these times and any times provided herein are used for purposes of example and may be varied.

Figure 12:
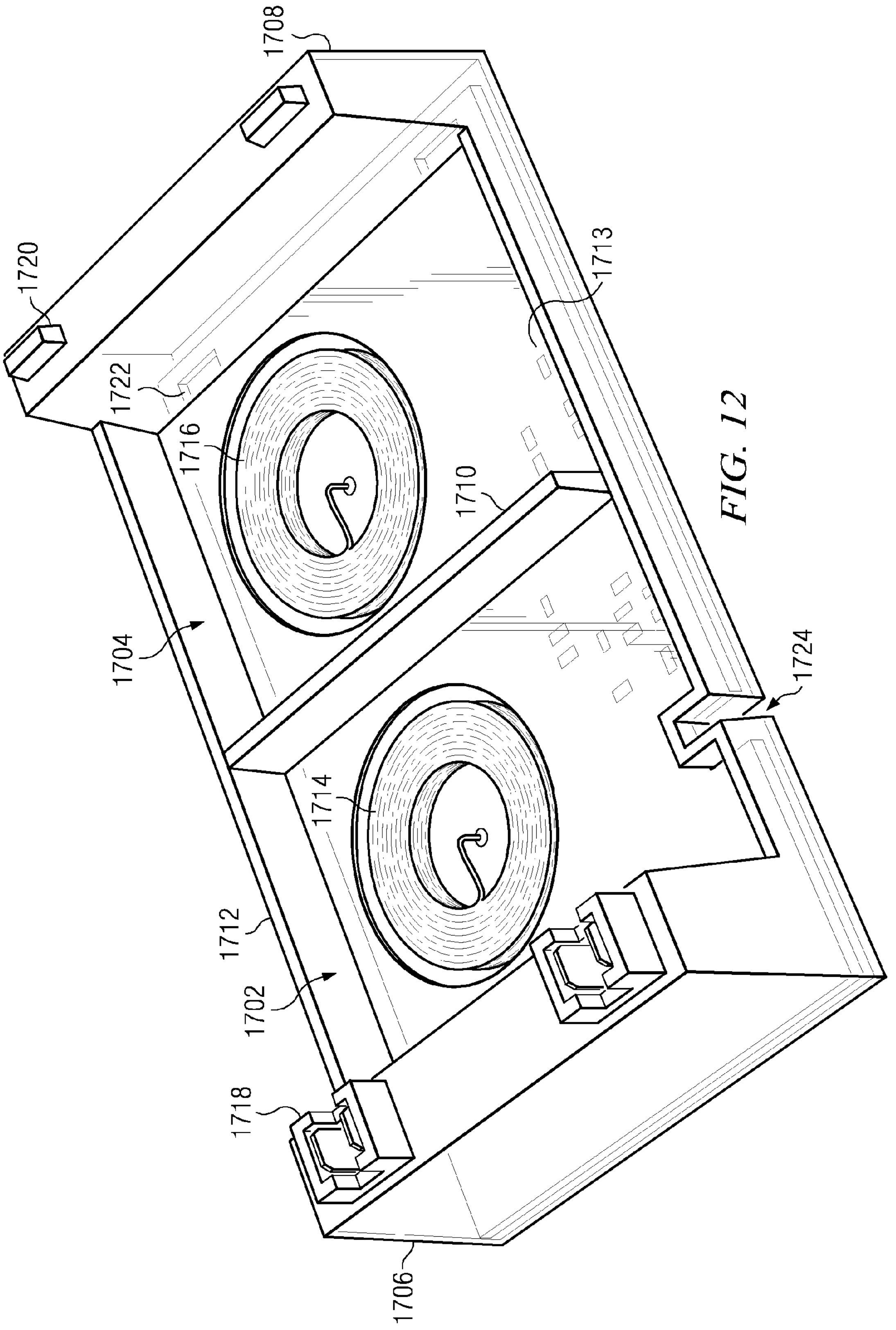
FIG. 12 illustrates a perspective view of a single tier of one embodiment of a charging station that may be used with multiple ones of the audio receiver of FIG. 6.

Referring to FIG. 12, in one embodiment, a perspective view of one tier of a charging station 1700 is illustrated. The charging station 1700 may be used to charge one or two of the audio receivers 122. Additional tiers (not shown) may be added to the charging station 1700 to provide additional charging capacity for other audio receivers 122.

The charging station 122 includes a housing 1701 defining two charging areas 1702 and 1704, which are each configured to receive a single audio receiver 122. In the present example, sides 1706 and 1708 and a center divider 1710 provide a slot into which audio receivers 122 may be placed. A back wall 1712 prevents audio receivers 122 from being pushed too far into charging station 1700.

Circuitry provided by a circuit board 1713 associated with each charging area 1702 and 1704 includes coils 1714 and 1716, respectively, that corresponds in location to the pickup coil of an audio receiver 122. The charging station 122 includes contacts 1718 that provide power to an upper tier when multiple tiers are used. Protrusions 1720 may be used to enter corresponding apertures in the underside of another tier or the circuit board 1713 to prevent slippage between the two tiers.

Figure 13A:
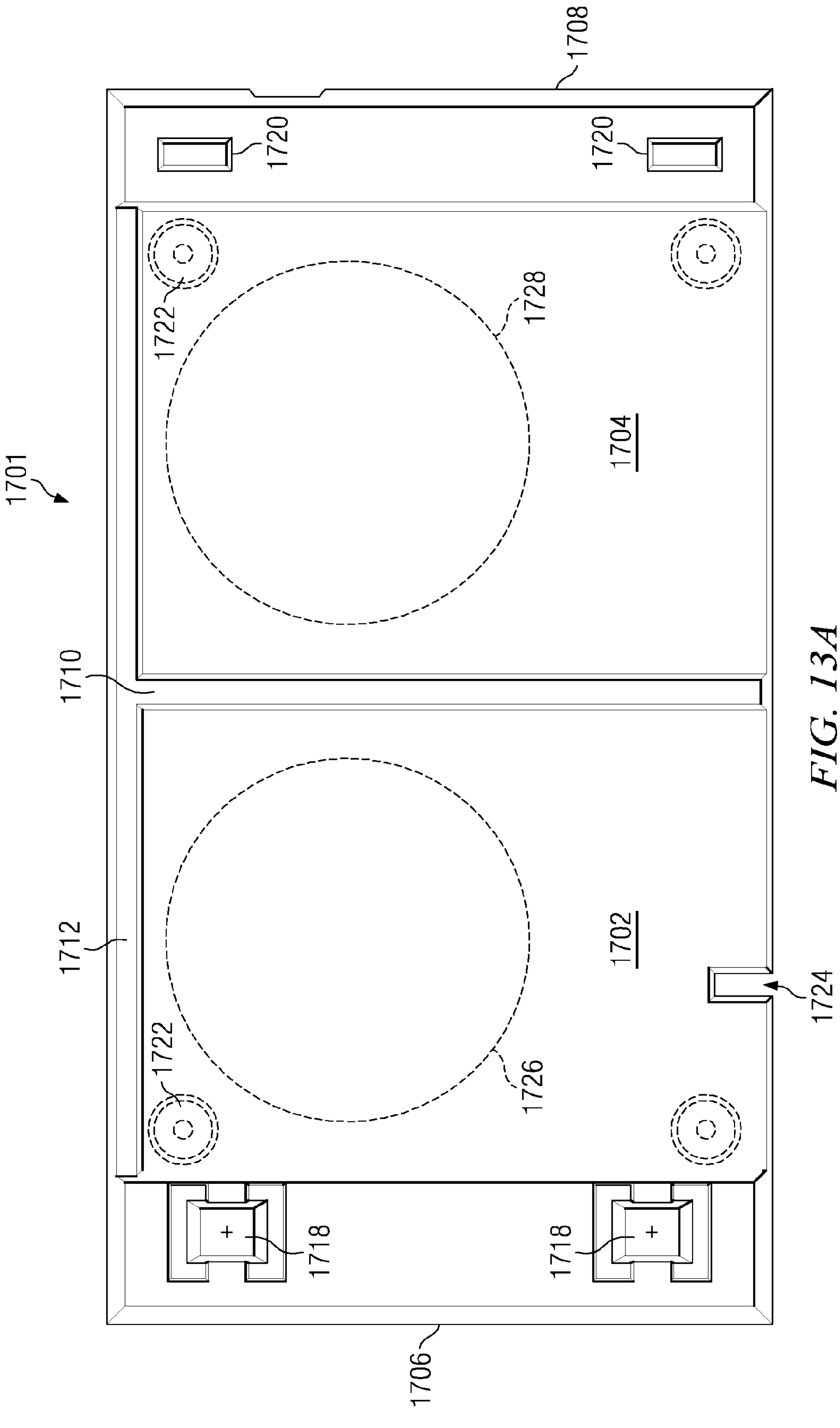
FIGS. 13A-13C illustrate a top view, a front view, and a rear view, respectively, of one tier of the charging station of FIG. 12.
Figure 13B:
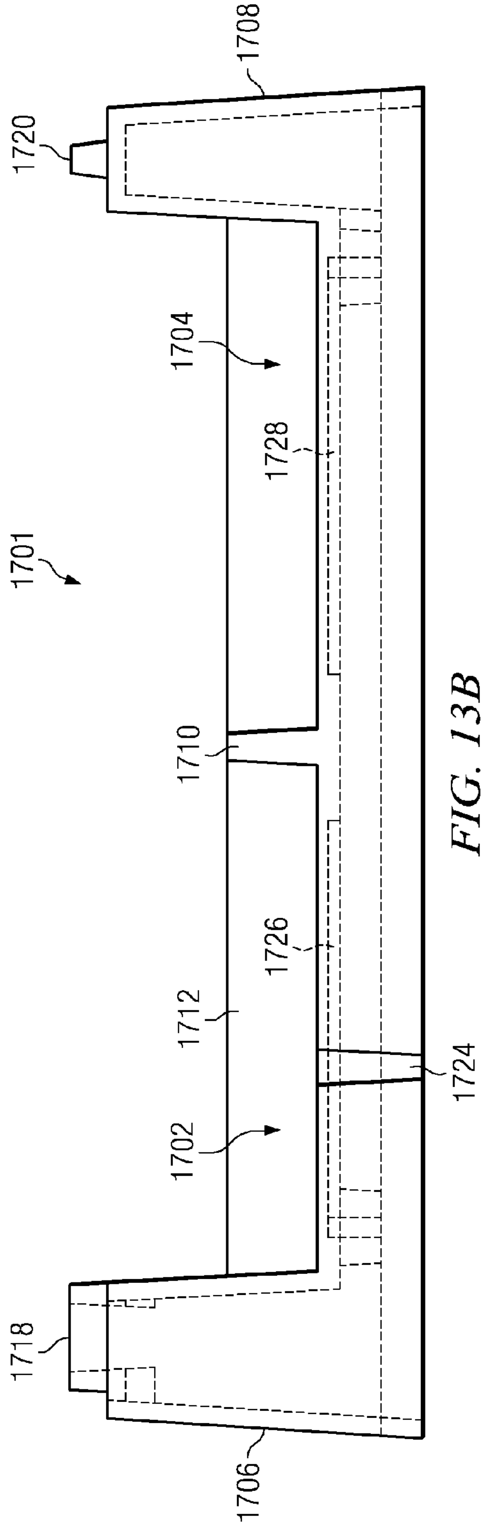
Figure 13C:
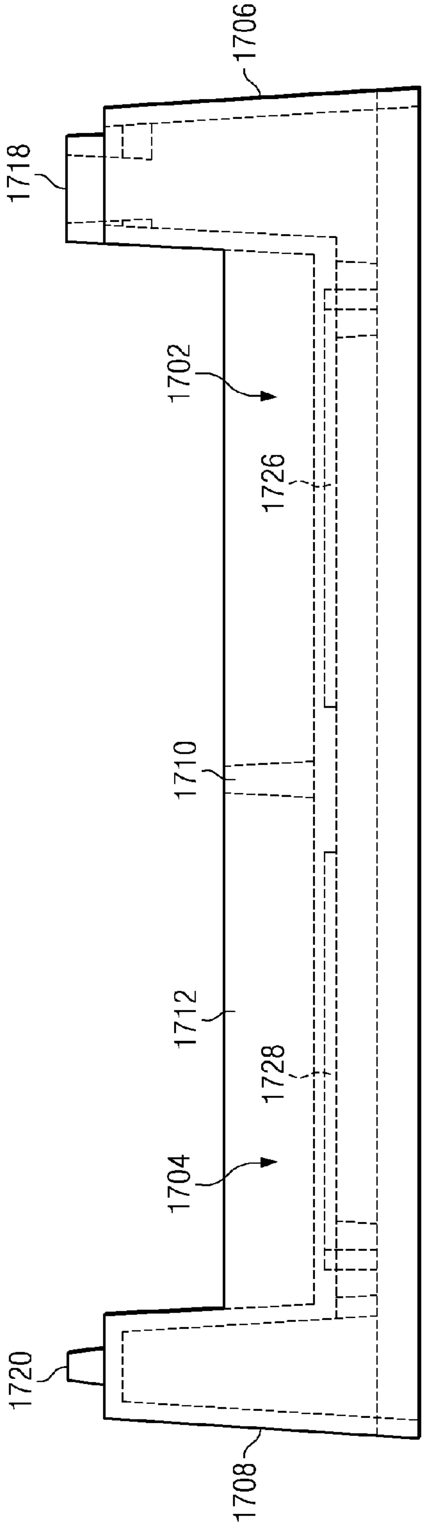

Referring to FIGS. 13A-13C, a top, front, and side view, respectively, of the charging station 1700 of FIG. 12A are illustrated. The housing 1701, which may be formed using a clear polycarbonate or any other suitable material, is configured to receive the circuit board 1713, which then forms the bottom of the housing 1701. Apertures 1722 are configured to receive fasteners (not shown), such as screws, for fastening the circuit board 1713 to the housing 1701. Slot 1724 enables the insertion of a card or other device of reset purposes. Spaces 1726 and 1728 provide positions for coils 1714 and 1716, respectively.

Figures 14, 14A:
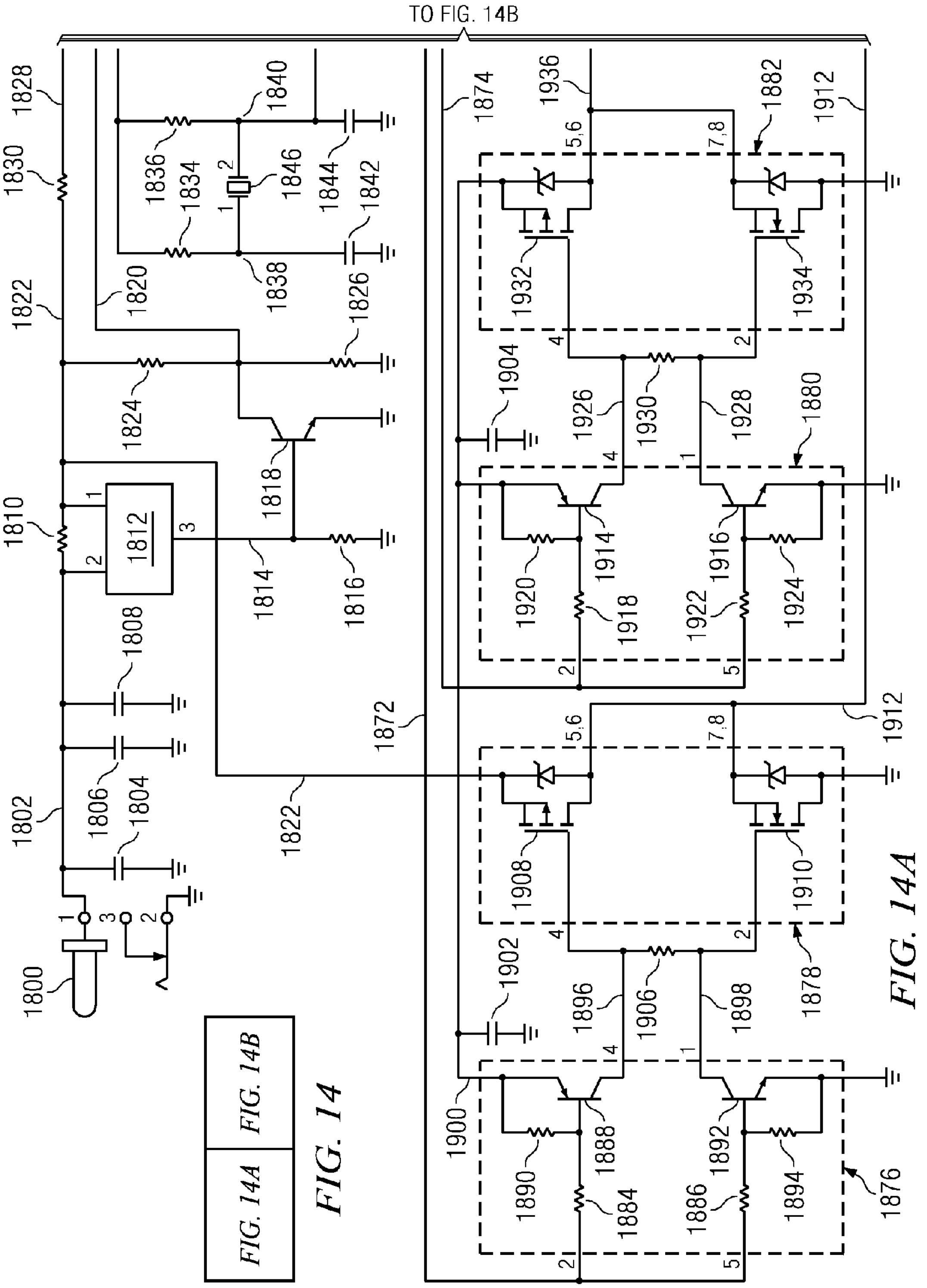
FIG. 14 illustrates a schematic diagram of one embodiment of a circuit board that may be used in the charging station of FIG. 12.
Figure 14B:
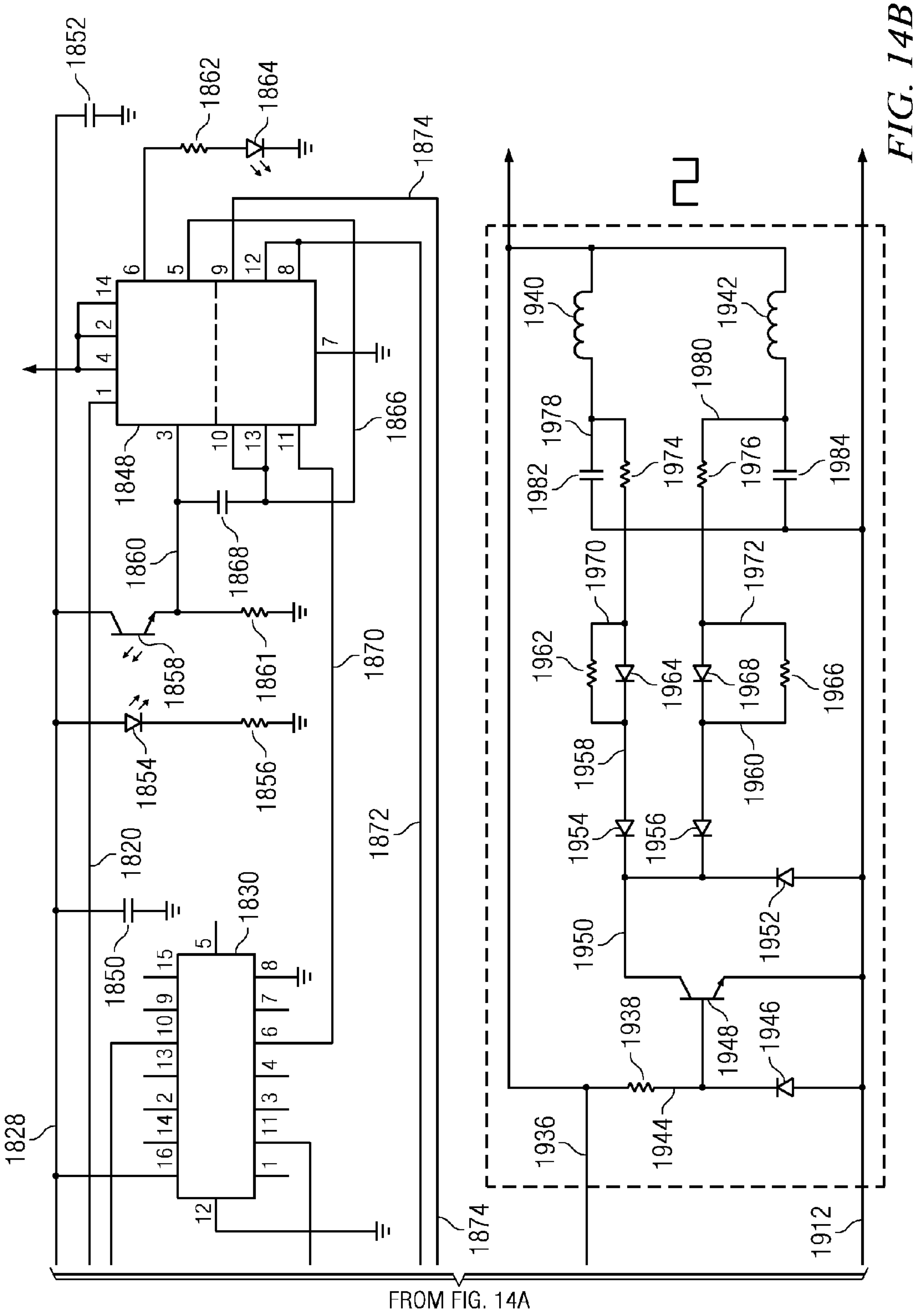

Referring to FIG. 14, a more detailed embodiment of the circuit board 1713 is provided. It is understood that the circuit board 1713 may be configured in many different ways and that the functionality provided by the circuit board 1713 may be provided in other ways, such as one or more application specific integrated circuits (ASICs).

An electrical jack 1800 receives external power and transfers the power to a node 1802. The node 1802 is grounded via parallel capacitors 1804, 1806, and 1808. The node 1802 is coupled to a resistor 1810 and to a high side current sense monitor 1812, which may be a ZXCT1009. The current sense monitor 1812 is coupled to a node 1814, which is in turn coupled to ground via a resistor 1816 and to the base of an n-channel BJT 1818. The emitter of the BJT 1818 is coupled to ground and the collector is coupled to a node 1820. The resistor 1810 is coupled to a node 1822 that is coupled to ground via one or more resistors 1824 and 1826, to a node 1828 via a resistor 1830, and to the source of a p-channel MOSFET 1908 that is part of an IC 1878.

An IC 1830, which is a SN74HC4060D in the present example, is coupled to the node 1828 via pin 16. Pin 10 is coupled to resistors 1834 and 1836, which are coupled in turn to nodes 1838 and 1840, respectively. Node 1838 is coupled to ground via a capacitor 1842 and is also coupled to a Pierce-type resonator 1846. Node 1840 is coupled to ground via a capacitor 1844, to the resonator 1846, and to pin 11 of the IC 1830. Pins 8 and 12 are coupled to ground. Pin 6 is coupled to an IC 1848.

The node 1828 is coupled to ground via capacitors 1850 and 1852. The node 1828 is also coupled to ground via an infrared LED 1854 in series with a resistor 1856. An infrared phototransistor 1858 is coupled to the node 1828 via its collector and to a node 1860 via its emitter. The node 1860 is also tied to pin 3 of the IC 1848 and to ground via a resistor 1861.

The IC 1848, which is a SN74HC74D in the present example, is coupled to a five volt line via pins 2, 4, and 14 and directly to ground via pin 7. Pin 6 is tied to ground via a resistor 1862 in series with an LED 1864. Pins 5, 10, and 13 are coupled to a node 1866, which is coupled to the node 1860 via a capacitor 1868. Pin 11 is coupled to pin 6 of the IC 1830 via a node 1870. Pins 8 and 12 are coupled to a node 1872 that is coupled to an IC 1876 and pin 9 is coupled to a node 1874 that is coupled to an IC 1880.

The IC 1876 includes a p-channel BJT 1888 and an n-channel BJT 1892. The base of the BJT 1888, which is accessed via pin 2 of the IC 1876, is coupled to the node 1872 via an internal (relative to the IC 1876) resistor 1884. The emitter of the BJT 1888 is coupled to a node 1900, which is coupled to ground via capacitors 1902 and 1904. The base of the BJT 1888 is also coupled to the node 1900 via an internal resistor 1890. The collector of the BJT 1888 is coupled to a node 1896. The base of the BJT 1892, which is accessed via pin 5 of the IC 1876, is coupled to the node 1872 via an internal resistor 1886. The emitter of the BJT 1888 is coupled to ground and the base is also coupled to ground via an internal resistor 1894. The collector of the BJT 1892 is coupled to a node 1898.

The IC 1878 includes a p-channel MOSFET 1908 and an n-channel MOSFET 1910. The nodes 1896 and 1898 are coupled to one another via a resistor 1906. The gate of the MOSFET 1908, which is accessed via pin 4 of the IC 1878, is coupled to the node 1896. The source of the MOSFET 1908 is coupled to the node 1822. The drain of the MOSFET 1908 is coupled to a node 1912. The gate of the MOSFET 1910, which is accessed via pin 5 of the IC 1878, is coupled to the node 1898. The source of the MOSFET 1910 is coupled to ground and the drain is coupled to the node 1912.

The IC 1880 includes a p-channel BJT 1914 and an n-channel BJT 1916. The base of the BJT 1914, which is accessed via pin 2 of the IC 1882, is coupled to the node 1874 via an internal resistor 1918. The emitter of the BJT 1914 is coupled to the node 1900, which is coupled to ground via capacitors 1902 and 1904 as described above. The base of the BJT 1914 is also coupled to the node 1900 via an internal resistor 1920. The collector of the BJT 1914 is coupled to a node 1926. The base of the BJT 1916, which is accessed via pin 5 of the IC 1882, is coupled to the node 1874 via an internal resistor 1922. The emitter of the BJT 1916 is coupled to ground and the base is also coupled to ground via an internal resistor 1924. The collector of the BJT 1916 is coupled to a node 1928.

The IC 1882 includes a p-channel MOSFET 1932 and an n-channel MOSFET 1934. The nodes 1926 and 1928 are coupled to one another via a resistor 1930. The gate of the MOSFET 1932, which is accessed via pin 4 of the IC 1882, is coupled to the node 1926. The source of the MOSFET 1932 is coupled to the node 1900. The drain of the MOSFET 1932 is coupled to a node 1936. The gate of the MOSFET 1934, which is accessed via pin 5 of the IC 1882, is coupled to the node 1928. The source of the MOSFET 1934 is coupled to ground and the drain is coupled to the node 1936.

The nodes 1912 and 1936 enter circuitry that is associated with each charging tier. The node 1936 is coupled to a resistor 1938 and two inductors 1940 and 1942, and transfers a 16384 Hz signal. The resistor 1938 couples the node 1936 to a node 1944, which is in turn coupled to the node 1912 via a diode 1946. The node 1944 is also coupled to the base of an n-channel BJT 1948. The collector of the BJT 1948 is coupled to a node 1950 and the emitter is coupled to the node 1912. The node 1950 is coupled to the node 1912 via a diode 1952 and is also coupled to diodes 1954 and 1956. The diode 1954 is coupled to a node 1958, which is in turn coupled to a node 1970 via a resistor 1962 connected in parallel with a charging indicator LED 1964. The diode 1956 is coupled to a node 1960, which is in turn coupled to a node 1972 via a resistor 1966 connected in parallel to a charging indicator LED 1968. The node 1970 is coupled to a node 1978 via a resistor 1974. The node 1978 is coupled to the node 1936 via the inductor 1940 and to the node 1912 via a capacitor 1982. The node 1972 is coupled to a node 1980 via a resistor 1976. The node 1980 is coupled to the node 1936 via the inductor 1942 and to the node 1912 via a capacitor 1984. The node 1912 transfers a 16386 Hz signal.

In operation, the charging station 1700 works on the principle of magnetic induction, similar to that of an inter-stage coupling transformer. Both the primary coil in the charging station 1700 and the secondary coil in the audio receiver 122 are series resonated with capacitors to allow a power transfer efficiency of approximately seventy percent. In the present example, the resonant frequency is 16384 Hz to allow for lighter coils with no iron core material. It is understood that other resonate frequencies may be used. When the primary and secondary coils are resonated, a phase shift occurs that causes the charging indicator LEDs 1964 and 1968 to illuminate. Each tier of the charging station 1700 accommodates two audio receivers 122 and may be stacked with the lower tier powering the upper tiers. Although the same circuit board 1713 may be used in each of the tiers, the charging station 1700 may be arranged so that only one tier in four (e.g., the lowest tier) has the circuitry needed to drive the coils. As described previously, the battery charging is managed by circuitry in the audio receiver 122.

The charging station 1700 of the present example as described above with respect to the circuit board 1713 includes the following features to perform the following wave generator and control functionality: a high-side current sensing monitor for overload protection, a 16 KHz time base resonator, an infrared slot overload reset system, a complementary non-current spike MOS high current wave generator, two inductive charging coils, and phase shift based charge indicators.

The charging station 1700 operates on an induction type of power transfer system. When audio receivers 122 are in the charging position and the battery management circuitry of one or both of the audio receivers enables the corresponding battery to be charged, the primary (e.g., sending) coil in the charging station 1700 and the secondary (e.g., pickup) coil in the audio receiver 122 enters a resonant state. This is possible since the coils are in series with high quality polypropylene resonating capacitors. Resonance occurs at a frequency of 16384 Hz. Due to the high ‘Q’ of the inductors and series capacitors, this frequency is quartz crystal controlled. The air or plastic gap is also controlled. The printed circuit board 1713 in the present example is 0.125 inches thick and forms the lower portion of the tier of the charging station 1700. In the present example, charging is initiated when an audio receiver 122 is placed in a charging position and continues until the audio receiver 122 deactivates the charging process (e.g., based on the thermistors). It is understood that other charging processes may be used, including beginning a charging process only when indicated by the audio receiver 122.

The charging station is organized into tiers that stack vertically, and each tier has slots for two receivers 122. The lowest tier generates the wave forms for the upper tiers. The circuit boards 1713 are identical for each tier, but electronic parts may be eliminated on the upper tiers as the upper tiers do not need to power the coils. These charging tiers snap together using fuse holder clips that serve as both a mechanical retainer and as electrical connectors allowing the 16 KHz square waves to carry upward to the upper tiers. It is understood that many types of connectors are possible, and that the use of fuse holder clips is only one example.

Although the charging station 1700 uses fast rise/fall time high voltage waveforms, they are only very narrow band emissions at 16 KHz. This is due to the fact that at resonance, where the current is present, the current wave form is a very narrow band sine wave. Resonating an induction type charging system has another advantage in that the energy transfer efficiency may be in excess of seventy percent. The primary coils are held in contact with the plastic on the surface of the charging station tier using propylene foam pads or other means. In the present example, the primary coils use no forms and are held together with self bonding magnet wire or similar restraints.

A wall type switching regulator supplies five volts to the input jack 1800. Some input filtering is done to lower the switching frequency of the wall unit. The high side current sensing monitor 1812 is employed using the heavy copper trace on the circuit board 1713 itself as a sense resistor. If an overload of the charging station 1700 occurs, the BJT 1818 resets the upper ‘D’ flip-flop of the IC 1848 to inhibit the chopping signal. The final square wave gets inverted at five volts through the use of high power MOSFETs. CMOS-type current transition spikes are eliminated by using resistors 1906 and 1930 to turn on the MOSFETs. The transistor arrays forming the ICs 1876 and 1880 actively pull current from the gate capacitances of the MOSFETs very quickly at the same time the complementary MOSFETs have their respective gates released. This allows the resistors to more slowly charge the gate capacitances until the MOSFETs can “turn on.” This allows a current dead time of about 200 nanoseconds, which is not enough time for the inductors to release a voltage spike but is enough to prevent a series path through the MOSFETs.

This voltage waveform is applied to each of the two coils in each of the tiers of the charging station 1700. It should be noted that the wall supply and MOSFETs can handle relatively high currents, which allows multiple (e.g., more than four) tiers to be stacked.

When an overload condition has been detected and cleared, the charging station 1700 can be reset by inserting a device (e.g., a matchbook or business card) into the slot 1724 in the plastic case, thereby breaking an infrared signal between the LED 1854 and the infrared phototransistor 1858. This resets the overload condition.

It will be appreciated by those skilled in the art having the benefit of this disclosure that this system for allowing selective listening on multiple televisions provides a transmitter, a receiver, and a charging station for the receiver. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A system for transmitting audio from a plurality of televisions to a plurality of viewers, comprising:

A plurality of audio transmitters each configured to couple to an associated one of the televisions, each audio transmitter having:

an input audio port configured to receive an audio signal only from an output audio port of the associated television;

a transmission channel switch having a plurality of transmission settings selectable in a setup operation, wherein each of the plurality of transmission settings corresponds to a different predefined frequency, and wherein the transmission channel switch is set to one of the different predefined frequencies to define the associated television;

transmission circuitry coupled to the transmission channel switch and input audio port, the transmission circuitry being configured to generate a frequency modulated signal representing the audio signal, wherein a frequency used to modulate the frequency modulated signal corresponds to the selected transmission setting of the transmission channel switch selected; and an optical transmitter coupled to the transmission circuitry and positioned to transmit the generated frequency modulated signal as light out of the optical transmitter; and an audio receiver controlled by one of the viewers for interfacing with an audio transmitter associated with a viewed one of the televisions and having:

a plurality of optical receivers configured to receive the generated frequency modulated signal transmitted as light by the audio transmitter associated with the viewed one of the televisions and to convert the received signal into an electrical current;

a reception channel switch having a plurality of reception settings selectable by the viewer, wherein each of the plurality of reception settings corresponds to one of the transmission settings, and wherein the reception settings are each associated with the frequency of the corresponding transmission setting such that the viewer can select the one of the reception settings associated with the viewed television;

reception circuitry coupled to the optical receivers and the reception channel switch, wherein the reception circuitry is configured to recover the audio signal from the electrical current based on a reception setting selected by the viewer; and an output port configured to provide the recovered audio to the viewer.

2. The system of claim 1 wherein the optical transmitters are infrared light emitting diodes (LEDs).

3. The system of claim 2 wherein the infrared LEDs are spaced along a curved line at a front portion of the audio transmitter and oriented to face away from the interior of the audio transmitter.

4. The system of claim 3 wherein the infrared LEDs are further oriented at different angles relative to a horizontal plane formed by a surface of the audio transmitter.

5. The system of claim 1 wherein the transmission channel switch includes sixteen transmission settings corresponding to a frequency range of approximately 469 KHz to 683 KHz with each frequency associated with a transmission channel separated from the adjacent frequencies by approximately 14.2 KHz.

6. The system of claim 1 wherein the reception channel switch is formed by first and second capacitive touch pads and detection circuitry associated with the first and second capacitive touch pads, wherein the detection circuitry is configured to detect activation of the reception channel switch when the first and second touch pads are bridged together, and wherein the detection circuitry is configured to select one of the plurality of reception settings based on the detected activation.

7. The system of claim 6 wherein the audio receiver further comprises a volume control formed by third and fourth capacitive touch pads and detection circuitry associated with the third and fourth capacitive touch pads, wherein the detection circuitry is configured to detect activation of the volume control when the third and fourth touch pads are bridged together, and wherein the detection circuitry is configured to increase or decrease a volume of the recovered audio provided to the output port based on the detected activation.

8. The system of claim 1 wherein the audio receiver further comprises a plurality of LEDs and corresponding LED control circuitry configured to illuminate the LEDs upon detecting input from the reception channel switch.

9. The system of claim 1 wherein the audio receiver further includes power management circuitry configured to shut off substantially all functions of the audio receiver after a predefined time period has passed without receiving input from the viewer and to continue scanning the reception channel switch for input, wherein the power management circuitry is configured to turn on the audio receiver upon activation of the reception channel switch.

10. The system of claim 1 further comprising a charging station having:

a power jack configured to receive power from a power source external to the charging station;

a sending coil positioned proximate to a charging area configured to receive the audio receiver; and power control circuitry coupled to the sending coil and the power jack.

11. The system of claim 10 wherein the audio receiver further comprises:

a receiving coil positioned within the audio receiver so as to be proximate to the sending coil for inductive coupling when the audio receiver is in the charging area;

a rechargeable battery electrically coupled to the receiving coil; and a battery management circuit coupled to the receiving coil and the rechargeable battery, wherein the battery management circuit is configured to monitor a temperature differential between two thermistors and to deactivate a charging procedure if the temperature differential is above a predefined threshold and the audio receiver is in the charging area.

12. The system of claim 11 wherein the battery management circuit is configured to pull the sending coil and the receiving coil into resonance at the beginning of the charging procedures.

13. The system of claim 1 further comprising a charging station having:

a first charging tier having:

a first charging area for a first audio receiver and a second charging area for a second audio receiver, wherein the first and second charging areas are associated with first and second sending coils, respectively; and first and second sides, wherein the first side includes a first electrical connection accessible from an upper surface of the first side and a first electrical conduit coupled to the first electrical connection and configured to transfer an electrical current through the first tier to the first electrical connection; and a second charging tier removably positioned on an upper surface of the first and second sides and having:

a third charging area for a third audio receiver and a fourth charging area for a fourth audio receiver, wherein the third and fourth charging areas are associated with third and fourth sending coils, respectively; and third and fourth sides, wherein the third side includes a second electrical connection configured to couple to the first electrical connection, a third electrical connection accessible from an upper surface of the third side, and a second electrical conduit coupled to the second and third electrical connections and configured to transfer an electrical current through the second tier from the second electrical connection to the third electrical connection.

14. The system of claim 13 wherein the first and second charging tiers are associated with first and second circuit boards, respectively, and wherein only the first circuit board includes circuitry needed to drive first, second, third, and fourth sending coils corresponding to the first, second, third, and fourth charging areas, respectively.

15. The system of claim 13 wherein the charging station includes an infrared emitter and an infrared detector positioned to detect an infrared beam emitted by the infrared emitter, and wherein the first tier includes circuitry for resetting the charging station if the infrared beam is broken.

16. An audio transmission system for interfacing between at least two televisions and two viewers, comprising:

a first audio transmitter having:

a first audio input jack coupled to a first audio output jack of a first television for receiving a first audio signal from the first television;

a first transmission circuit configured to transmit the first audio signal as a first frequency modulated signal that is modulated with the first audio signal at a first frequency; and a plurality of first infrared emitters configured to broadcast the first frequency modulated signal by amplitude modulating the first infrared emitters;

a second audio transmitter having:

a second audio input jack coupled to a second audio output jack of a second television for receiving a second audio signal from the second television;

a second transmission circuit configured to transmit the second audio signal as a second frequency modulated signal that is modulated with the second audio signal at a second frequency that is different than the first frequency; and a plurality of second infrared emitters configured to broadcast the second frequency modulated signal amplitude modulating the second infrared emitters;

a first receiver operated by a first viewer viewing the first television having:

a plurality of first infrared detectors configured to receive and amplitude demodulate the first frequency modulated signal and to convert the first frequency modulated signal to an electrical current;

a first reception circuit that is viewer configured to retrieve the first audio signal from the electrical current representing the first frequency modulated signal based on a setting selected by the first viewer; and a first audio output port configured to provide the first audio signal to the first viewer; and a second receiver operated by a second viewer viewing the second television having:

a plurality of second infrared detectors configured to receive the second frequency modulated signal and to convert the second frequency modulated signal to the electrical current;

a second reception circuit viewer configured to retrieve the second audio signal from the electrical current representing the second frequency modulated signal based on a setting selected by the second viewer; and a second audio output port configured to provide the second audio signal to the second viewer.

17. The audio transmission system of claim 16 wherein the first and second audio transmitters are configured to use the first and second frequencies, respectively, from a plurality of possible frequencies based on a user configurable setting provided by each of the first and second audio transmitters.

18. The audio transmission system of claim 17 wherein the viewer configured first or second reception circuit user configurable setting is configured using a pair of capacitively coupled touch pads.

19. The audio transmission system of claim 16 further comprising a charging station having a first charging area for the first audio transmitter and a second charging area for the second audio receiver, wherein the first charging area includes a first sending coil that is positioned within range of a first receiving coil of the first audio receiver when the first audio receiver is positioned in the first charging area, and wherein the second charging area includes a second sending coil that is positioned within range of a second receiving coil of the second audio receiver when the second audio receiver is positioned in the second charging area.

20. The audio transmission system of claim 19 wherein the charging station includes an infrared beam, and wherein the charging station is configured to reset when the infrared beam is broken.

21. An audio transmission system for interfacing between at least two televisions and two viewers, comprising:

a first audio transmitter having:

a first audio input jack coupled to a first audio output jack of a first television having a first display for receiving a first audio signal from the first television;

a first transmission circuit configured to transmit the first audio signal as a first frequency modulated signal that is frequency modulated with the first audio signal at a first frequency; and a plurality of first emitters configured to be amplitude modulated with the first frequency modulated signal and broadcast directionally outward from the first display directed towards a viewer of the first display;

a second audio transmitter having:

a second audio input jack coupled to a second audio output jack of a second television having a second display for receiving a second audio signal from the second television;

a second transmission circuit configured to transmit the second audio signal as a second frequency modulated signal that is frequency modulated with the second audio signal at a second frequency that is different than the first frequency; and a plurality of second emitters configured to be amplitude modulated with the second frequency modulated signal and broadcast directionally outward from the second display directed towards a viewer of the second display; and a receiver having:

a plurality of directionally oriented detectors configured to receive the broadcast from either of the plurality of first or second emitters from the associated respective first or second audio transmitters associated with the first or second display to which the detectors are directionally oriented;

an amplitude demodulator for extracting the one of the first and second frequency modulated signals associated with the received broadcast;

a frequency demodulator to frequency demodulate the extracted one of the first or second frequency modulated signals to provide the respective first or second audio signal;

and an audio output port configured to provide the demodulated first or second audio signal to an external audio device.

* * * * *